United States Patent
Wu et al.

(10) Patent No.: US 12,262,303 B2
(45) Date of Patent: Mar. 25, 2025

(54) APPLYING ACCESS CONTROL IN A COMMUNICATION DEVICE

(71) Applicant: GOOGLE LLC, Mountain View, CA (US)

(72) Inventors: Chih-Hsiang Wu, Taoyuan (TW); Teming Chen, Taoyuan (TW)

(73) Assignee: GOOGLE LLC, Mountain View, CA (US)

(*) Notice: Subject to any disclaimer, the term of this patent is extended or adjusted under 35 U.S.C. 154(b) by 355 days.

(21) Appl. No.: 17/607,865

(22) PCT Filed: Apr. 28, 2020

(86) PCT No.: PCT/US2020/030193
§ 371 (c)(1),
(2) Date: Oct. 29, 2021

(87) PCT Pub. No.: WO2020/223190
PCT Pub. Date: Nov. 5, 2020

(65) Prior Publication Data
US 2022/0217616 A1 Jul. 7, 2022

Related U.S. Application Data

(60) Provisional application No. 62/841,230, filed on Apr. 30, 2019.

(51) Int. Cl.
*H04W 48/06* (2009.01)
*H04W 74/00* (2009.01)

(52) U.S. Cl.
CPC ......... *H04W 48/06* (2013.01); *H04W 74/002* (2013.01)

(58) Field of Classification Search
None
See application file for complete search history.

(56) References Cited

U.S. PATENT DOCUMENTS

| 2015/0055573 A1 | 2/2015 | Miklos et al. |
| 2016/0205630 A1 | 7/2016 | Chen et al. |

(Continued)

FOREIGN PATENT DOCUMENTS

| CN | 105850188 A | 8/2016 |
| CN | 108702681 A | 10/2018 |

(Continued)

OTHER PUBLICATIONS

First Examination Report for India Application No. 202147054723, dated Jun. 3, 2022.

(Continued)

*Primary Examiner* — Minh Trang T Nguyen
(74) *Attorney, Agent, or Firm* — MARSHALL, GERSTEIN & BORUN LLP

(57) ABSTRACT

A UE activates a timer for applying access control to transmissions associated with a certain access category during an access control period, in response to a first system information message received via a radio interface and a mobile-originated access request (1702). While the timer is running, the UE receives a second message that indicates a potential transition of the UE (i) from a current state associated with a protocol for controlling radio resources to another state associated with the protocol, or (ii) from a current cell to a new cell (1704). In response to the second message, the UE continues to apply the access control to the transmissions for the access category, for a remainder of the access control period (1706).

14 Claims, 19 Drawing Sheets

(56) References Cited

U.S. PATENT DOCUMENTS

| | | | | |
|---|---|---|---|---|
| 2018/0220397 | A1* | 8/2018 | Paredes Cabrera ... | H04W 72/23 |
| 2018/0324675 | A1* | 11/2018 | Lee ....................... | H04W 48/02 |
| 2020/0045626 | A1* | 2/2020 | Kim ..................... | H04W 48/06 |
| 2021/0029769 | A1 | 1/2021 | Zhang et al. | |
| 2021/0068036 | A1* | 3/2021 | Chun ................... | H04W 48/08 |
| 2021/0227450 | A1* | 7/2021 | Chun ................... | H04W 48/20 |
| 2021/0266817 | A1* | 8/2021 | Wallentin ............ | H04W 68/005 |

FOREIGN PATENT DOCUMENTS

| | | | |
|---|---|---|---|
| CN | 109 314 902 A | 2/2019 | |
| CN | 109314913 A | 2/2019 | |
| CN | 109328471 A | 2/2019 | |
| WO | WO-2018/128947 A2 | 7/2018 | |

OTHER PUBLICATIONS

International Search Report and Written Opinion for Application No. PCT/US2020/030193, dated Jul. 22, 2020.
Intel Corporation, "Handling of Barring Timer T30x (1769)," 3GPP Draft (2018).
Intel Corporation," Clarification on AC Barring Timer Handling for CN Type Change," 3GPP Draft (2019).
First Office Action for Chinese Application No. 202080044239.2, dated Dec. 11, 2023.
Second Office Action for Chinese Application No. 202080044239.2, dated Jul. 17, 2024.
Nokia, "Access Barring Control for RRC_Inactive," 3GPP TSG-RAN WG2 #101 (2018).

* cited by examiner

APPLYING ACCESS CONTROL IN A COMMUNICATION DEVICE

FIELD OF THE DISCLOSURE

This disclosure relates generally to wireless communications and, more particularly, to applying access control, or "access barring check," to transmissions for (i.e., associated with) certain access categories.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

To address network congestion more efficiently, a core network (CN) and user equipment units (UEs) in communication with the CN can implement an access control (or "access barring check") mechanism. The 3GPP standard TS 38.300 v15.5.0 defines a so-called Unified Access Control (UAC) mechanism for 5G new radio (NR) systems.

According to the UAC, a CN at some point determines that the congestion has reached a certain level and selects one or more "access categories," or types of data, for which the CN should initiate access control to temporarily reduce traffic. The CN indicates the selected access category to a radio access network (RAN), and the RAN then broadcasts an indication of the selected access category to UEs. In some cases, the RAN determines that the congestion has reached a certain level and selects one or more access categories for which the RAN should initiate access control to temporarily reduce traffic and broadcasts an indication of the selected one or more access categories to UEs. Examples of access categories include emergency sessions, mobile-originated voice calls, mobile-originated video calls, mobile-terminated voice calls, mobile-terminated video calls, delay-tolerant sessions, etc.

When there is no network congestion for a certain access category, the network can decide to not broadcast a barring factor for this access category. When the UE receives the system information that does not include a barring factor for a certain access category, the UE can transmit data for this access category without performing an access barring check (i.e., determine that access is always allowed).

Generally speaking, the UAC operates in a probabilistic, rather than deterministic, manner to reduce traffic for a certain access category. To limit traffic in an access category, the CN or RAN (collectively, "the network") broadcasts a relatively low barring factor for the access category as a part of system information. A UE receives an indication that the network has initiated access control for a certain access category and performs an access barring check (e.g., a unified access control (UAC) check) for the indicated access category. To perform the access barring check, the UE generates a random number in a predefined range and transmits data for the access category only if the random number is lower than the barring factor. Thus, by lowering the barring factor for a certain access category, the network statistically reduces the number of instances UEs transmit data in this access category.

When the random number is not lower than the barring factor, the UE starts an access control timer. The UE typically controls transmissions for the controlled access category until the access control timer expires. However, the RAN and/or the CN in some cases causes the UE to transition from one state of the Radio Resource Control (RRC) protocol to another state, and consequently stop the access control timer for all access categories due to the state transition. More particularly, the UE can operate in the RRC_IDLE state, in which the UE does not have an active radio connection with a base station; the RRC_CONNECTED state, in which the UE has a radio connection with the base station; or the RRC_INACTIVE state, in which the UE has a suspended radio connection with the base station. According to TS 38.331 v15.5.1, for example, the UE stops the access control timer for all access categories when transitioning from RRC_IDLE to RRC_CONNECTED upon receiving an RRCSetup message, when transitioning from RRC_INACTIVE to RRC_CONNECTED upon receiving an RRCResume message, when transitioning from RRC_CONNECTED to RRC_IDLE or RRC_INACTIVE upon receiving an RRCRelease message, when transitioning from RRC_INACTIVE to RRC_IDLE upon receiving an RRCRelease message, etc. Further, the UE operating in RRC_INACTIVE state stops the access control timer for all access categories when an RRCRelease message indicates that the UE should stay in RRC_INACTIVE (rather than transition to RRC_IDLE).

As a result of the RRC transition (or an indication that the UE should remain in RRC_INACTIVE state), the time at which the UE begins to transmit data in the controlled access category may not match the expectation of the network, which in turn can cause the network to manage network congestion less efficiently.

SUMMARY

A UE of this disclosure activates a timer for applying access control to transmissions associated with a certain access category (or the "barring timer"), in accordance with an indication from the RAN. When the UE receives an RRC message that causes the UE to transition from the current RRC state to another RRC state, or includes an indication that the UE should remain in the RRC_INACTIVE state, the UE continues to apply access control to the access category.

More particularly, the UE in some implementations continues to run the barring timer even after the UE transitions to another RRC state or remains in RRC_INACTIVE. In another implementation, the UE stops the timer and performs access control (or barring) alleviation after the UE transitions to another RRC state or remains in RRC_INACTIVE. Prior to transmitting a message for this access category, the UE performs the access barring check. In one implementation, the RRC layer stops the barring timer and reports access control (or barring) alleviation to the non-access stratum (NAS) layer after the UE transitions to another RRC state or remains in RRC_INACTIVE. Then, prior to transmitting a message for this access category, the NAS layer in this implementation requests the RRC layer to perform the access barring check for this access category. In another implementation, the NAS layer performs the access barring check for this access category.

In some implementations, the CN or the RAN (collectively, "the network") includes an indication of access control status in an RRC message. The network for example can indicate, in the RRCRelease message, whether the UE should continue applying access control to one or more access categories or stop applying access control. The indication can be a binary flag (stop barring/continue barring), an information element whose presence indicates one of the actions (stop barring/continue barring) and whose absence indicates the other action, or any other suitable indicator. Further, the network in some implementations includes separate indications for each access category (e.g., stop barring access category 1 (AC1) but continue barring access category 2 (AC2) and access category 3 (AC3)). Still further, the UE can report access categories where the UE currently is applying access control, and the network can specify an appropriate action (stop barring/continue barring) for each of these categories.

When the UE performs a handover from a cell to another cell, where both cells are connected to the same core network (e.g., 5GC), the UE can implement similar techniques because the congestion can occur at the CN or RAN level, and access control the UE performs in one cell should apply in another cell under similar conditions. The cells can correspond to the same RAT or different RATs (e.g., 5G NR and EUTRA).

One example embodiment of these techniques is a method in a UE for controlling transmissions. The method can be executed by one or more processors and includes activating, in response to a first system information message received via a radio interface and a mobile-originated access request, a timer for applying access control to transmissions for a certain access category during an access control period; receiving, via the radio interface and while the timer is running, a second message that indicates a transition of the UE (i) from a current state associated with a protocol for controlling radio resources to another state associated with the protocol, or (ii) from a current cell to a new cell; and in response to receiving the second message, continuing to apply the access control to the transmissions for the access category, for a remainder of the access control period.

Another example embodiment of these techniques is a method in a UE for controlling transmissions. The method can be executed by one or more processors and includes activating, in response to a first system information message received via a radio interface and a mobile-originated access request, a timer for applying access control to transmissions for a certain access category during an access control period; receiving, via the radio interface and while the timer is running, a second message that indicates a transition of the UE (i) from a current state associated with a protocol for controlling radio resources to another state associated with the protocol, or (ii) from a current cell to a new cell; and in response to receiving the second message, continuing to run the timer for a remainder of the access control period.

Yet another example embodiment of these techniques is a method in a UE for controlling transmissions. The method can be executed by one or more processors and includes activating, in response to a first system information message received via a radio interface and a mobile-originated access request, a timer for barring transmissions for a certain access category during a barring period; receiving, via the radio interface and while the timer is running, a second system information message indicating barring alleviation in the certain access category (e.g., the message the second information message does not include barring information for a certain access category or includes a high barring factor); stopping, prior to the expiration of the barring period, the timer in response to a message associated with a protocol for controlling radio resources; and performing, in response to the stopping of the timer, an access barring check for the certain access category to determine that transmissions for the certain access category are allowed.

Another embodiment of these techniques is a UE comprising one or more processors and a computer-readable medium storing instructions that, when executed by the one or more processors, cause the UE to perform the method above.

Still another embodiment of these techniques is a method in a network for controlling congestion. The method can be executed by one or more processors and includes transmitting, via a radio interface, a first message indicating an access category for which a UE is to apply access control, generating a second message indicating whether the UE should transition from its current state associated with a protocol for controlling radio resources to another state associated with the protocol; and transmitting, via the radio interface, the second message to the UE. Generating the second message includes generating an indication of whether the UE should continue applying access control for the access category and including the indication in the second message.

Still another embodiment of these techniques is a radio access network (RAN) including one or more base stations, and a core network (CN) communicatively coupled to the RAN and configured to execute the method above.

DETAILED DESCRIPTION OF THE DRAWINGS

Figure 1A:
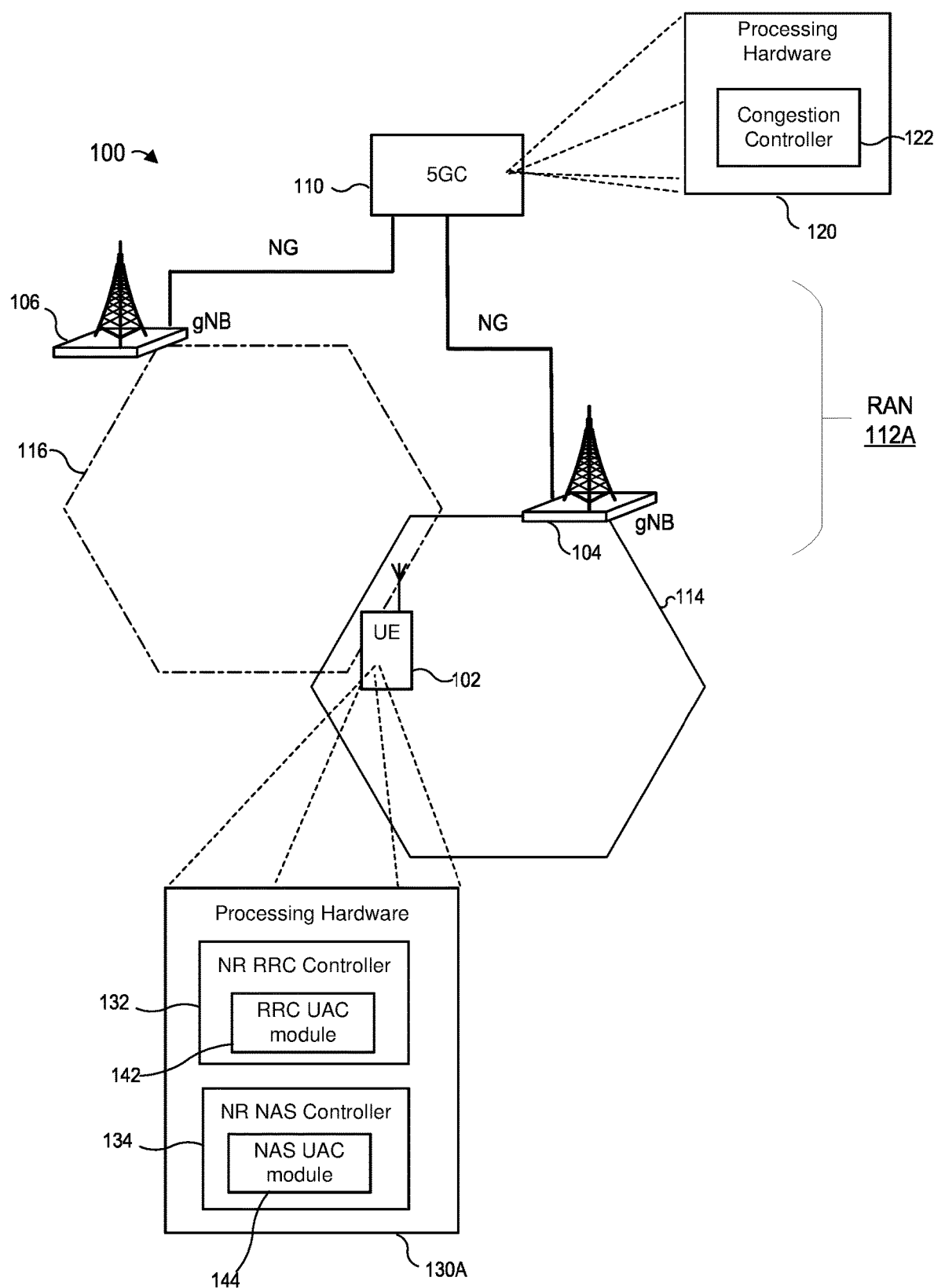
FIG. 1A is a block diagram of an example wireless communication network in which a UE and/or a network can utilize access control techniques of this disclosure.

FIG. 1A depicts an example wireless communication system in which a UE 102 and a network 100 implement an access control mechanism such as UAC. In operation, the network 100 applies access control to data associated with a certain access category due to network congestion, for example, and notifies the UE 102 accordingly. The UE 102 in response begins to apply access control to transmissions in the specified access category. Subsequently to receiving the notification from the network 100, the UE 102 receives a message related to a potential RRC state transition, and continues or stops applying access control for this access category according to the techniques of this disclosure.

The network 100 in this example configuration includes a base station 104 connected to a 5G core network (5GC) 110. The base station 104 can be a 5G Node B (gNB) that operates as a node in a next-generation radio access network (NG-RAN) 112A and supports an NR cell 114. The NG-RAN 112A also includes a gNB 106 that supports an NR cell 116. The cells 114 and 116 can partially overlap, so that the gNB 104 can hand the UE 102 over to the gNB 106. In general, the NG-RAN 112A can include any suitable number of base stations gNBs supporting NR cells and/or next-generation evolved Nodes B (ng-eNBs) supporting Evolved Universal Terrestrial Radio Access (EUTRA) cells. An example configuration in which the 5GC 110 is connected to a gNB as well as an ng-eNB is discussed below with reference to FIG. 1B. Some of the base stations operating in the network 100 may be interconnected. For example, the gNB 104 may connect to the gNB 106 via an Xn interface (not shown to avoid clutter).

Although the examples below refer specifically to 5GC and specific RAT types, 5G NR and EUTRA, in general the techniques of this disclosure also can apply to other suitable radio access and/or core network technologies.

The 5GC 110 includes processing hardware 120 (e.g., in an Access and Mobility Management Function (AMF) device or another suitable device) that can include one or more general-purpose processors such as central processing units (CPUs) and non-transitory computer-readable memory storing machine-readable instructions executable on the one or more general-purpose processors, and/or special-purpose processing units. The processing hardware 120 in an example implementation includes a congestion controller 122 configured to determine when congestion levels for various access categories reach a certain threshold level or fall below the threshold level, and cause the network 100 to notify UEs currently operating in the cells of the network 100. More particularly, the 5GC 110 can generate updated barring information (e.g., a high barring factor for AC1, a low barring factor for AC2, etc., and the base station 104 can broadcast this information in the cell 114 as a part of system information. In some implementations, the RAN 112A (e.g., the gNB 104) can include processing hardware that implements the congestion controller 122 instead of, or in addition to, the 5GC 110.

The UE 102 is equipped with processing hardware 130A that also can include one or more general-purpose processors such as CPUs and non-transitory computer-readable memory storing machine-readable instructions executable on the one or more general-purpose processors, and/or special-purpose processing units. The processing hardware 130A in an example implementation includes an NR RRC controller 132 configured to generate outbound (uplink) and process inbound (downlink) messages related to releasing existing radio connections, setting up new radio connections, reconfiguring existing radio connections, etc. The processing hardware 130A further includes an NR NAS controller 134 configured to control the establishment and maintenance of communication sessions.

In an example implementation, the NR RRC controller 132 and the NR NAS controller 134 include an RRC UAC module 142 and an NAS UAC module 144, respectively. The RRC UAC module 142 is configured to process notifications from the network 100 regarding establishment and alleviation of barring information for one or more access categories, control access control (or "barring") timers, report barring information to the NAS UAC module 144, process requests from the NAS UAC module 144 to check barring information, etc. The NAS UAC module 144 determines when the UE 102 has data or signaling associated with certain access categories to transmit to the network 100, whether the UE 102 can transmit this data in view of the current barring information, etc.

Figure 1B:
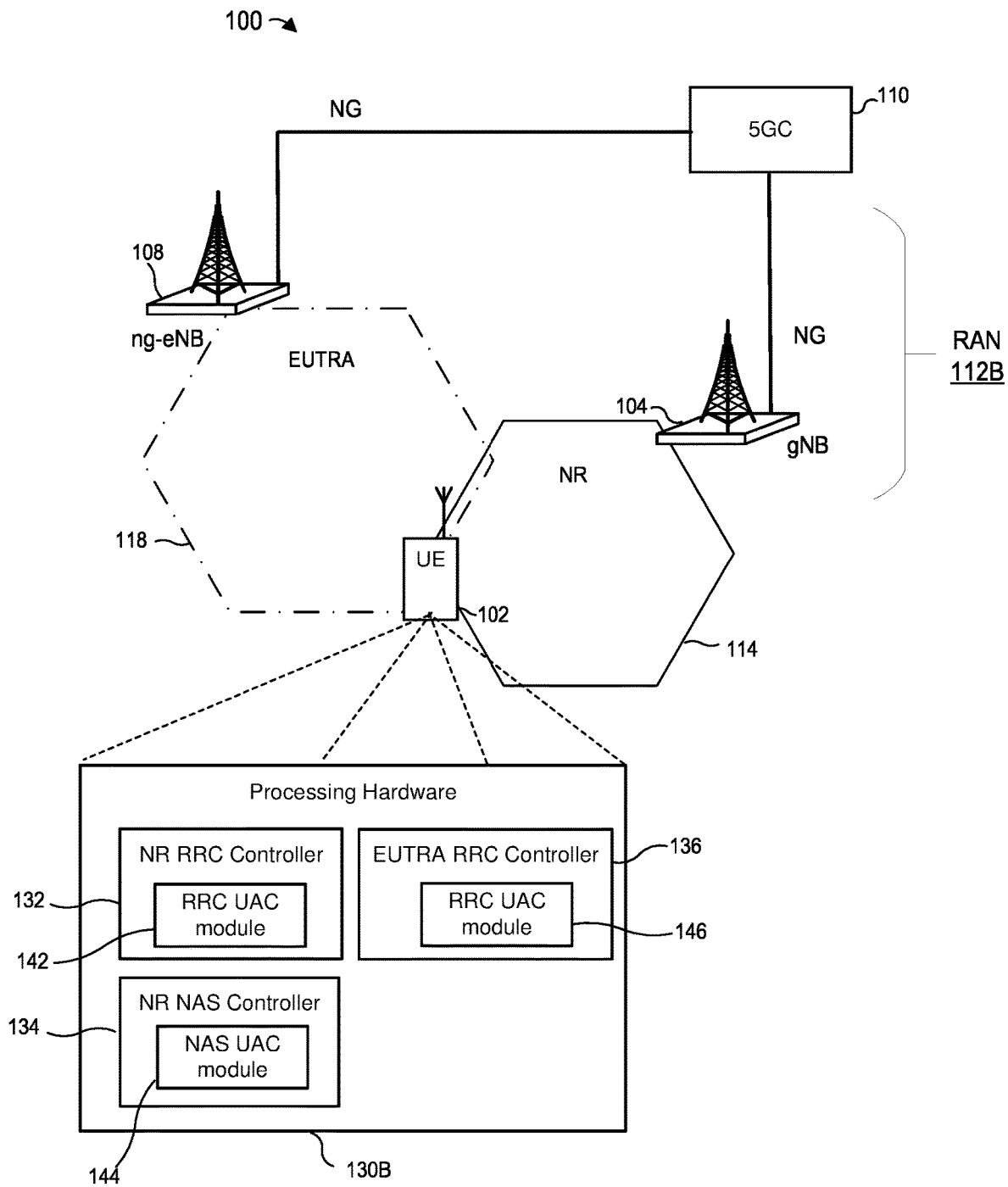
FIG. 1B is a block diagram of another example configuration of the communication network of FIG. 1A, in which a core network (CN) is connected to multiple radio access networks (RANs) supporting different respective radio access technologies (RATs)

FIG. 1B illustrates another implementation of the network 100, in which the 5GC 110 communicates with an NG-RAN 112B including a base station 104 that operates as a gNB as well as a base station 108 that operates as an eNB and supports a EUTRA cell 118. The gNB 104 may connect to the ng-eNB 108 via an Xn interface (not shown to avoid clutter). The cells 114 and 118 can have an area of overlap in which the UE 102 can perform a handover from the gNB 106 to the eNB 108, or from the eNB 108 to the gNB 106. The UE 102 includes processing hardware 130B which, similar to the processing hardware 130A of FIG. 1A, includes the NR RRC controller 132 and the NR NAS controller 134. However, the processing hardware 130B additionally includes a EUTRA RRC controller 136 configured to support RRC functionality when the UE 102 operates in the EUTRA cell 118. In an example implementation, the EUTRA RRC controller 136 includes an RRC UAC module 146. In another example implementations, the EUTRA RRC controller 136 shares the RRC UAC module 142 with the NR RRC controller 132.

Next, example operation of the NR RRC controller 132, the NR NAS controller 134, and the network 100 is discussed below in more detail with reference to several example scenarios and methods. For simplicity, the disclosure can refer to the NR RRC controller 132 as "UE RRC 132" and to the NR NAS controller 134 as "UE NAS 134," in those scenarios that involve only the 5G NR radio interface and do not involve the EUTRA radio interface.

Figure 2:
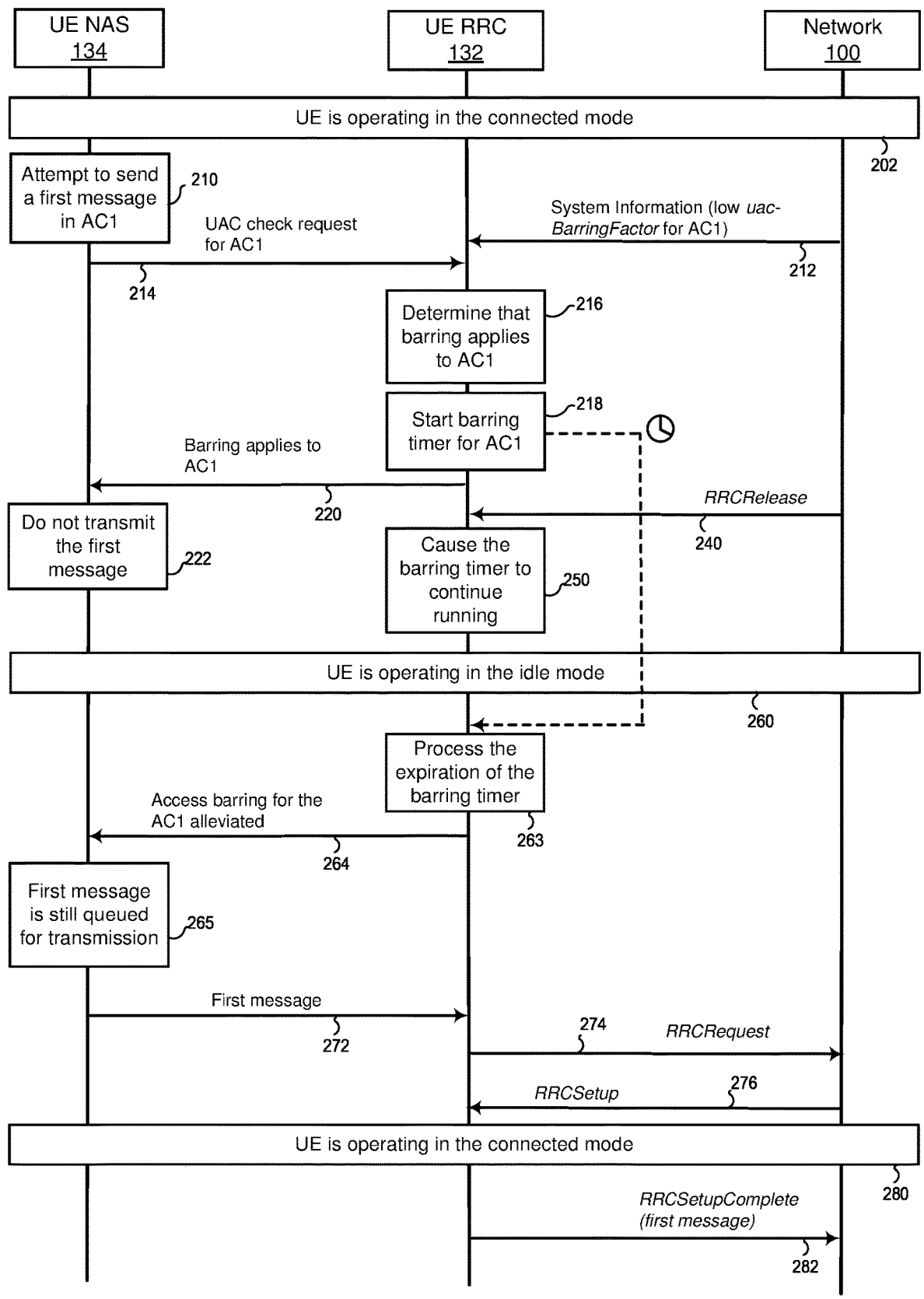
FIG. 2 illustrates a scenario in which the UE transitions from RRC_CONNECTED to RRC_IDLE in response to a message from the network, and causes the barring timer to continue running so as to continue applying access control to transmissions in the corresponding access category.

Referring first to FIG. 2, the UE 102 at the beginning of this scenario operates 202 in the connected mode, i.e., the UE RRC 132 is in the RRC_CONNECTED state. The NR NAS 134 at this time can operate in the 5GMM-CONNECTED state.

The UE NAS 134 determines 210 that the UE 102 has a message to send to the 5GC 110, and this message belongs to a certain access category, e.g., AC1. The UE NAS 134 can receive this message from a higher layer, for example. For clarity, the disclosure refers to this message and similar messages in the other scenarios as "the first message." Meanwhile, the network 100 determines that the congestion for traffic in AC1 has reached a certain level and broadcasts 212 system information including a low barring factor (e.g., a low value of uac-BarringFactor) for AC1. Referring back to FIG. 1A, for example, the 5GC 110 can transmit the barring factor to the gNB 104, and the gNB 104 in turn can broadcast system information including the barring factor in the cell 114. In addition to the barring factor, the network 100 can include a timing parameter (e.g., uac-BarringTime) for AC1, to specify how the UE 102 should configure the barring timer, as discussed below.

The UE RRC 132 can receive 212 the system information prior to, concurrently, or subsequently to the occurrence of event 210. In any case, by the time the UE NAS 134 checks 214 whether the UE NAS 132 has received barring information for AC1, the UE RRC 132 has determined that access control is in place for AC1. In this scenario, the UE RRC 132 performs 216 the check and determines that barring applies to AC1. As discussed above, the UE RRC 132 to this end can obtain a random value and compare the random value to the value of uac-BarringFactor received from the network 100; because the value of uac-BarringFactor is low in this scenario, the probability that the UE RRC 132 determines to apply barring for AC1 is high).

The UE RRC 132 starts 218 a barring timer after the event 216 and indicates 220 to the UE NAS 134 that barring applies to transmissions in AC1. The UE NAS 134 does not transmit 222 the first message. The events 218 and 220 can occur in any suitable order. Unless the UE RRC 132 prematurely stops the barring timer, the barring timer expires after a barring period. In an example implementation, the network 100 specifies a value of the uac-BarringTime parameter, and the UE RRC 132 calculates the barring period based on this value and a random number. In some implementations, the barring timer can be implemented as the T309 or T390 RRC timer.

At a later time and while the barring timer is running, the UE RRC 132 receives 240 an RRCRelease message from the network 100. The RRCRelease message indicates to the UE 102 that the UE 102 should transition to RRC IDLE. The network 100 can transmit the RRCRelease message after a period of inactivity of the UE 102 in order to preserve radio resources, for example. In another scenario, the network 100 can include in the RRCRelease message an indication (e.g., a SuspendConfig IE) that the UE 102 should transition to RRC_INACTIVE rather than the RRC_IDLE.

In response to receiving the RRCRelease message, the UE RRC 132 transitions 260 to RRC_IDLE but does not stop the barring timer. The UE RRC 132 thus causes 250 the barring timer to continue running for the remainder of the barring period, provided the UE RRC 132 does not detect another intervening event. In a similar manner, if the UE RRC 132 transitions to RRC_INACTIVE due to an indication in the RRCRelease message, the UE RRC 132 causes the barring timer to continue running for the remainder of the barring period.

When the UE 102 transitions from RRC_CONNECTED to RRC_IDLE, another timer or multiple timers unrelated to access barring may be running. The UE 102 causes the barring timer to continue running regardless of the action the UE 102 takes with respect to the other timers. For example, one or more of a T321 RRC timer for controlling a measurement reporting procedure, a T325 RRC timer for controlling deprioritization of frequencies, a phr-ProhibitTimer, a periodicBSR-Timer, or an sr-ProhibitTimer may be running just prior to the transition to RRC_IDLE, and the UE 102 stops at least some of these timers upon transitioning 260 to RRC_IDLE.

The barring timer expires when the UE RRC 132 is in the RRC_IDLE state (or RRC_INACTIVE state), and the UE RRC 132 processes 263 the expiration event. The UE RRC 132 indicates 264 access barring alleviation for AC1 (i.e., barring no longer applies to transmissions in AC1) to the UE NAS 134. The UE NAS 134 then determines 265 that the UE 102 still queues the first message for transmission and sends 272 the first message to the UE RRC 132. In response to receiving the first message, the UE RRC 132 performs an RRC establishment procedure. In particular, the UE RRC 132 sends 274 an RRCRequest message to the network 100 and receives 276 an RRCSetup message from the network 100 in response. The UE RRC 132 transitions to the RRC_CONNECTED state in response to receiving the RRCSetup message, and the UE 102 accordingly begins to operate 280 in the connected mode. The UE RRC 132 then sends 282, to the network 100, an RRCSetupComplete message encapsulating the first message. Alternatively, the UE RRC 132 encapsulates the first message in a ULInformationTransfer message.

In this manner, the UE RRC 132 prevents the UE NAS 134 from transmitting messages in AC1 prior to the expiration of the barring timer, despite the transition from RRC_CONNECTED to RRC_IDLE or RRC_INACTIVE. The UE 102 thus allows the network 100 to more reliably control network congestion in AC1.

Figure 3A:
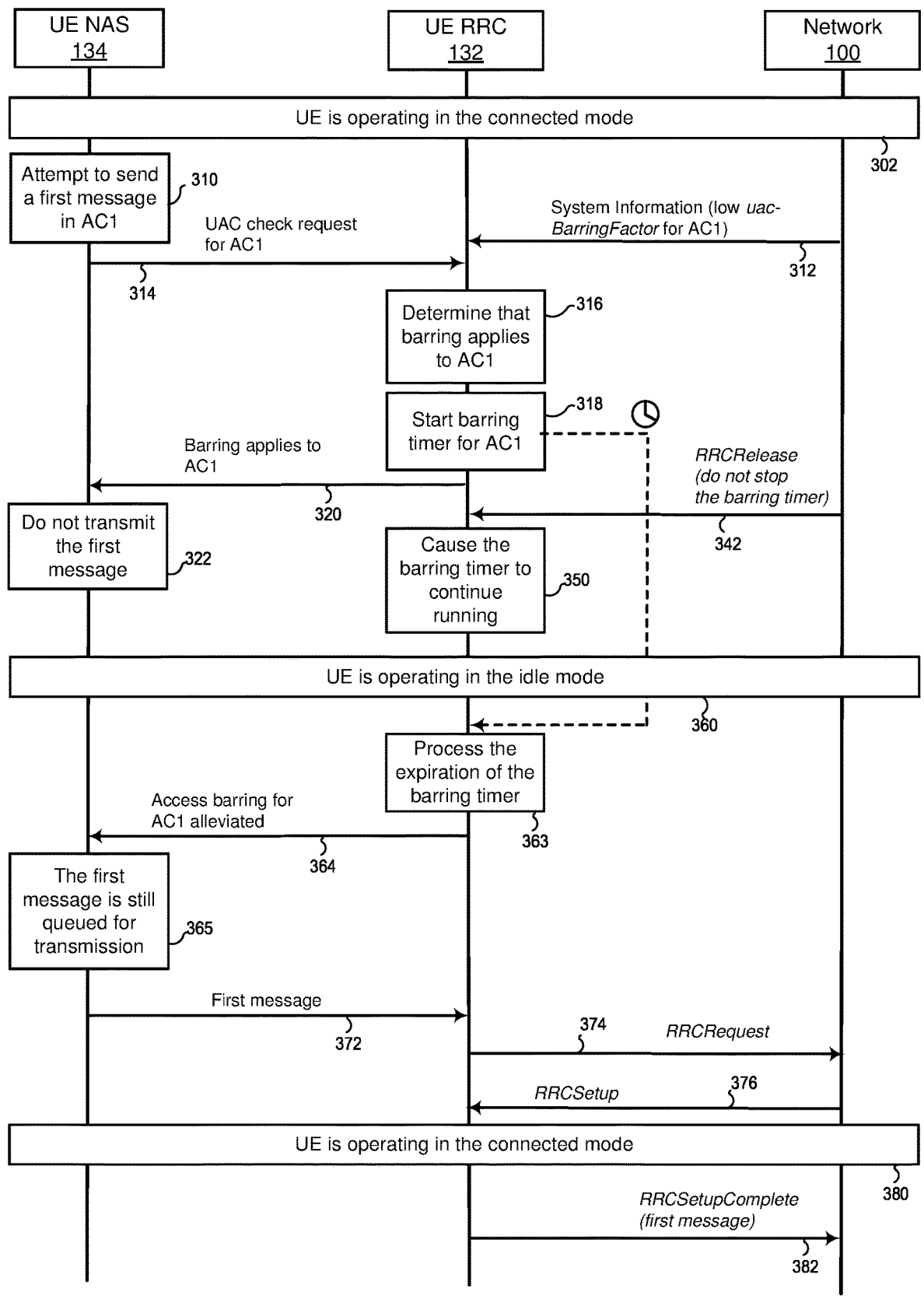
FIGS. 3A and 3B illustrate scenarios in which the UE transitions from RRC_CONNECTED to RRC_IDLE in response to a message from the network, and causes the timer to continue running or stop running, respectively, based on an indication included in the message.
Figure 3B:
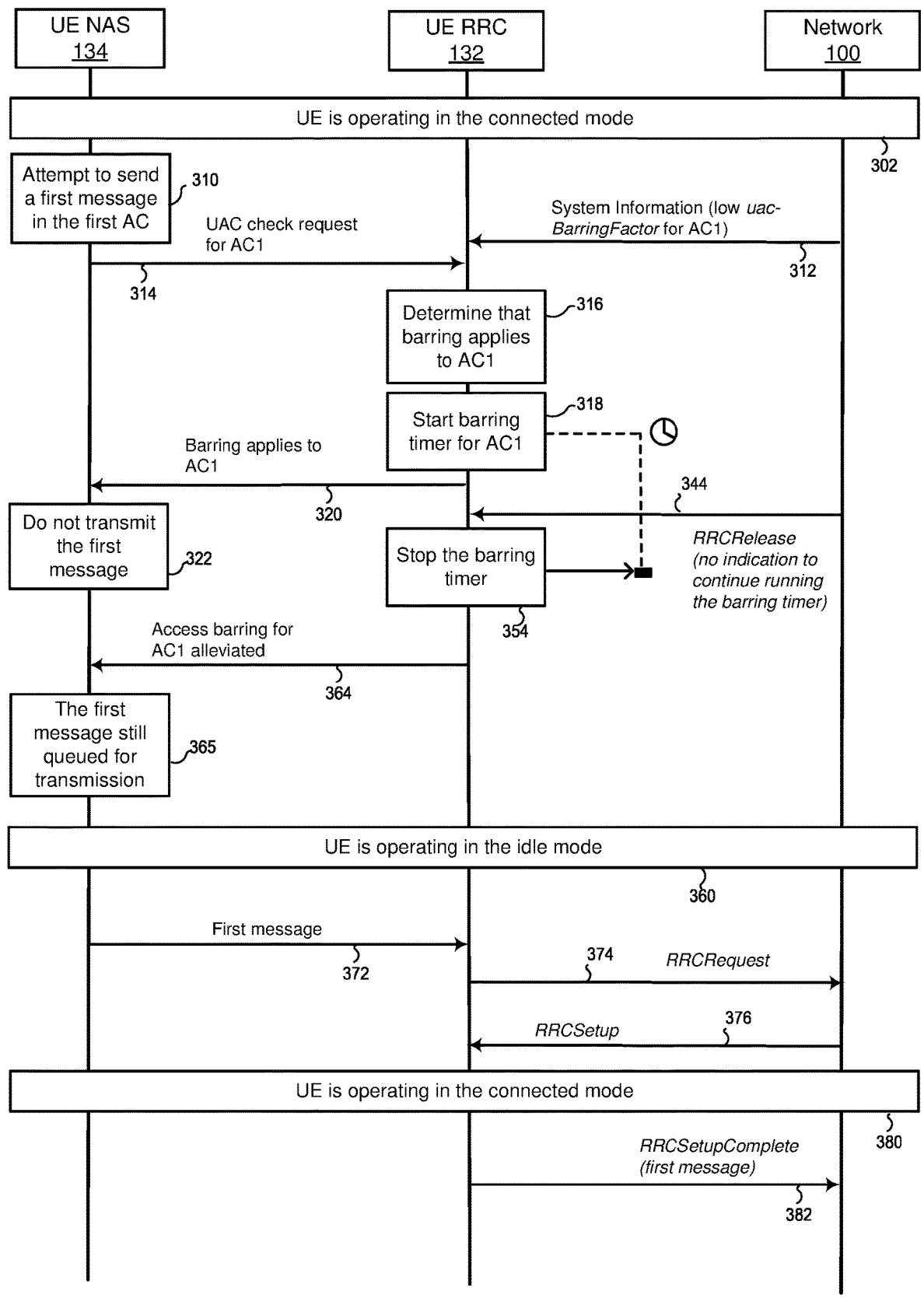

In the scenarios of FIGS. 3A and 3B, the UE 102 relies on an explicit indication from the network 100 to determine whether the UE 102 should stop the barring timer or cause the barring timer to continue running. Similar to the scenario FIG. 2, the UE 102 initially operates 302 in the connected mode (e.g., with the UE RRC 132 is in the RRC_CONNECTED state and the NR NAS 134 in the 5GMM-CONNECTED state).

Events 310-322 are similar to the respective ones of the events 210-222 of FIG. 2. As discussed in more detail above, these events correspond to the UE NAS 134 identifying a first message in AC1 for transmission, the UE RRC 132 receiving a low barring factor for AC1, the UE NAS 134 checking whether the UE 102 should apply access control to AC1, the UE RRC 132 determining that access barring applies and starting a barring timer for AC1, and the UE RRC 132 notifying the UE NAS 134 that barring currently applies to AC1.

At a later time and while the barring timer is running, the UE RRC 132 receives 342 from the network 100 an RRCRelease message that includes an indication that the UE 102 should not stop any of the one or more barring timers that may be running at the UE 102. Depending on the implementation, the indication can have the format of a binary flag (e.g., '0'=stop barring, '1'=continue barring), a flag or an IE whose presence indicates one of the actions (stop barring/continue barring) and whose absence indicates the other action, or any other suitable format. More particularly, the network 100 in one implementation includes a certain flag to indicate that the UE 102 should not stop any barring timers (or a particular barring timer for a certain access category, as discussed below), and does not include this flag to indicate that the UE 102 should stop one or more barring timers; but in another implementation, the network 100 includes the flag to indicate that the UE 102 should stop one or more barring timers, and does not include this flag to indicate that the UE 102 should cause the one or more barring timers to continue running. The UE RRC 132 receives 342 the RRCRelease message, processes the indication, and determines that the barring timer should continue running in accordance with this indication.

In this implementation shown in FIG. 3A, the indication in the RRCRelease message is not specific to any access category. Thus, multiple barring timers are running, e.g., one barring timer for AC1 and another barring timer for AC2, the UE RRC 132 causes 350 every barring timer to continue running.

Similar to the RRCRelease message in the scenario of FIG. 2, the RRCRelease message in this scenario indicates that the UE 102 should transition 360 to RRC_IDLE or, when the message includes a corresponding indicator, RRC_INACTIVE. Subsequent events 363-382 are similar to the respective ones of the events 263-282 of FIG. 2. More specifically, these events correspond to the UE RRC 132 indicating access barring alleviation for AC1 to the UE NAS 134, the UE NAS 134 identifying and sending to the UE RRC 132 the first message queued for transmission, the UE RRC performing an establishment procedure to transmit the first message to the network 100, and the UE 102 transitioning to the connected mode.

As illustrated in FIG. 3B, when the UE RRC 132 receives 344 from the network 100 an RRCRelease message that does not include an indication that the UE 102 should continue running one or more barring timers, the UE RRC 132 stops 354 the barring timer prior to the expiration of the barring period. The UE RRC 132 then indicates 364 access barring alleviation for AC1 to the UE NAS 134. Because the UE RRC 132 reports access barring alleviation prior to the expiration of the barring period, the events 365-382 occur earlier in this scenario than in the scenario of FIG. 3A.

Thus, by formatting the RRCRelease message with an indication of whether the UE 102 should or should not stop the barring timer, the network 100 can control the earliest time when the UE 102 can transmit data in one or more controlled access categories. The network 100 can make this choice based on the current level of congestion, for example.

Figure 4:
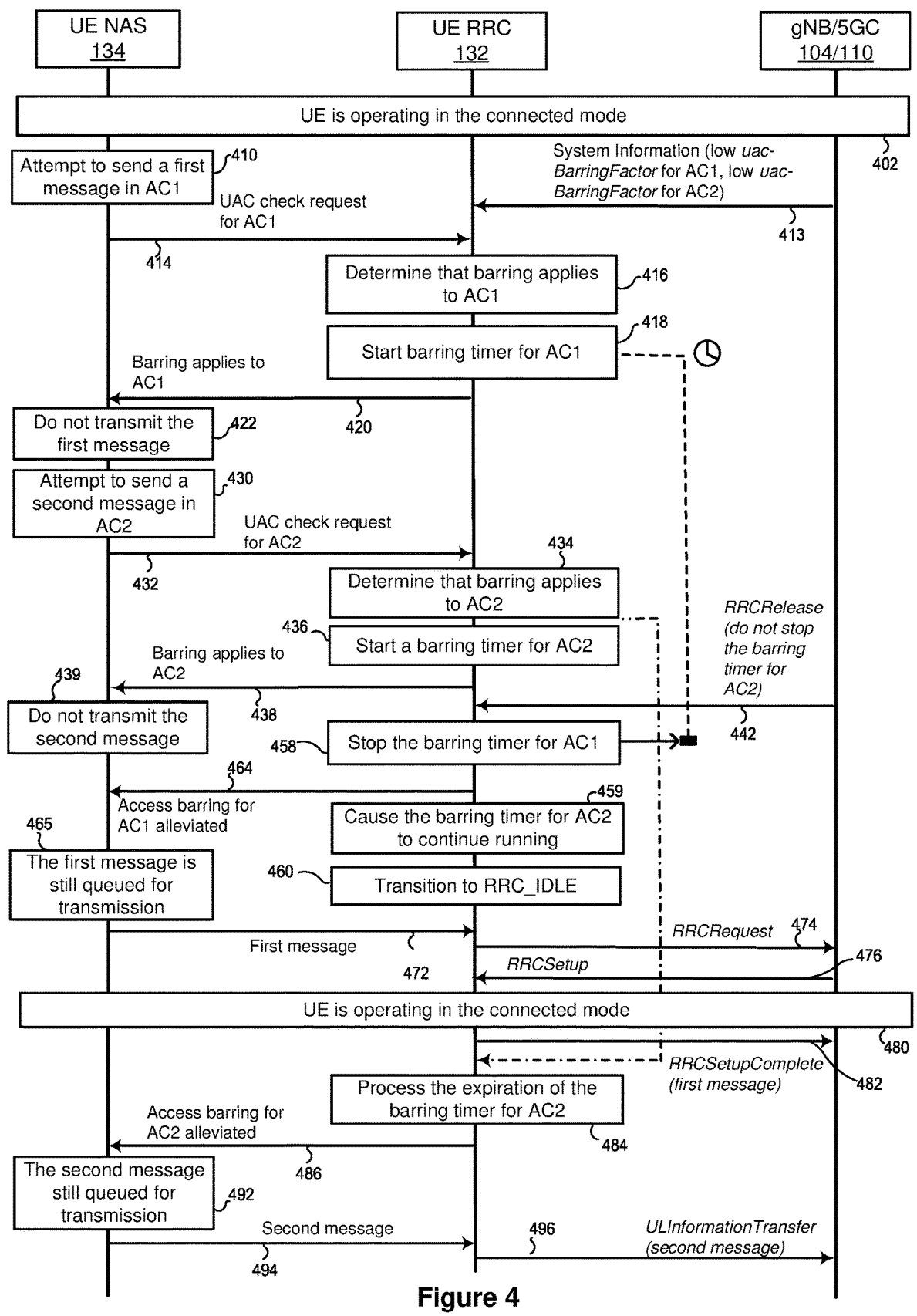
FIG. 4 illustrates a scenario in which the UE transitions from RRC_CONNECTED to RRC_IDLE in response to a message from the network, and causes respective timers for access categories to continue running or stop running in accordance with the category-specific indications included in the message.

Further, the network 100 in some implementations can provide AC-specific indications to the UE 102 regarding barring timers the UE RRC 132 may be running. Referring to FIG. 4, the UE 102 in this scenario initially operates 402 in the connected mode (e.g., with the UE RRC 132 is in the RRC_CONNECTED state and the NR NAS 134 in the 5GMM-CONNECTED state). The UE 102 receives 413 system information including a low barring factor for AC1 as well as a low barring factor for AC2. The UE 102 can receive the barring factors for AC1 and AC2 in the same broadcast message or separate broadcast messages. Events 414-422 are similar to the respective ones of the events 214-222 of FIG. 2 and events 314-322 of FIGS. 3A and 3B.

At some point after determining to not transmit 422 the first message due to access barring of AC1, the UE NAS 134 determines 430 that the UE 102 should send, to the 5GC 110, a message that belongs to another access category, e.g., AC2. The disclosure refers to this message and similar messages in the other scenarios as "the second message." The UE NAS 134 checks 432 whether the UE NAS 132 has received barring information for AC2. The UE RRC 132 then performs 434 the check (e.g., obtains a random value and compare the random value to the value of uac-BarringFactor received from the network 100) determines that barring applies to AC2.

The UE RRC 132 starts 436 a barring timer after the event 434 and indicates 438 to the UE NAS 134 that barring applies to transmissions in AC2. The UE NAS 134 does not transmit 439 the second message. The events 436 and 438 can occur in any suitable order. Unless the UE RRC 132 stops the barring timer in response to a certain event, the barring timer for AC2 expires after a barring period. In an example implementation, the network 100 specifies a value of the uac-BarringTime parameter for AC2, and the UE RRC 132 calculates the barring period for AC2 based on this value and a random number. In some implementations, the barring timer can be implemented as the T309 RRC timer. The barring period for AC2 need not be the same as the barring period for AC1.

The UE RRC 132 receives 442 from the network 100 an RRCRelease message that includes an indication that the UE 102 should not stop the barring timer for AC2. The RRCRelease message does not include a similar indication for AC1. In response, the UE RRC 132 stops 458 the barring timer for AC1 but causes 459 the barring timer for AC2 to continue running. The UE RRC 132 thus causes the barring timer for AC2 to continue running for the remainder of the barring period for AC2, provided the UE RRC 132 does not detect an intervening event. The UE RRC 132 indicates 464 access barring alleviation for AC1 (i.e., barring no longer applies to transmissions in AC1) to the UE NAS 134. Further, in response to receiving the RRCRelease message, the UE RRC 132 transitions 460 to RRC_IDLE, and accordingly the UE 102 begins to operate in the idle mode. Alternatively, the UE RRC 132 can transition to RRC_INACTIVE due to an indication in the RRCRelease message.

The UE NAS 134 then determines 465 that the UE 102 still queues the first message for transmission and sends 472 the first message to the UE RRC 132. In response to receiving the first message, the UE RRC 132 performs an RRC establishment procedure. In particular, the UE RRC 132 sends 474 an RRCRequest message to the network 100 and receives 476 an RRCSetup message from the network 100 in response. The UE RRC 132 transitions to the RRC_CONNECTED state in response to receiving the RRCSetup message, and the UE 102 accordingly begins to operate 480 in the connected mode. The UE RRC 132 then sends 482, to the network 100, an RRCSetupComplete message encapsulating the first message. Alternatively, the UE RRC 132 encapsulates the first message in a ULInformationTransfer message.

The barring timer for AC2 expires when the UE is operating in the RRC_CONNECTED state, and the UE RRC 132 processes 484 the expiration event. The UE RRC 132 indicates 486 access barring alleviation for AC2 (i.e., barring no longer applies to transmissions in AC2) to the UE NAS 134. The UE NAS 134 then determines 492 that the UE 102 still queues the second message for transmission and sends 494 the second message to the UE RRC 132. The UE RRC 132, which already is in RRC_CONNECTED and thus does not require an RRC establishment procedure, encapsulates the second message in a ULInformationTransfer message and sends 496 the ULInformationTransfer message to the network 100.

In another example, the UE NAS 134 then determines 465 that the UE 102 does not queue the first message for transmission and does not send 472 the first message to the UE RRC 132. The barring timer for AC2 expires when the UE is operating in the RRC_IDLE state, and the UE RRC 132 processes 484 the expiration event. The UE RRC 132 indicates 486 access barring alleviation for AC2 (i.e., barring no longer applies to transmissions in AC2) to the UE NAS 134. The UE NAS 134 then determines 492 that the UE 102 still queues the second message for transmission and sends 494 the second message to the UE RRC 132. In response to receiving the second message, the UE RRC 132 performs an RRC establishment procedure based on the second message 492 rather than the discontinued first message 465. In particular, the UE RRC 132 sends 474 an RRCRequest message to the network 100 and receives 476 an RRCSetup message from the network 100 in response. The UE RRC 132 transitions to the RRC_CONNECTED state in response to receiving the RRCSetup message, and the UE 102 accordingly begins to operate 480 in the connected mode. The UE RRC 132 then sends 482, to the network 100, an RRCSetupComplete message encapsulating the second message. Alternatively, the UE RRC 132 encapsulates the second message in a ULInformationTransfer message.

Thus, according to the approach illustrated in FIG. 4, the network 100 can control the earliest time when the UE 102 can transmit data in a particular access category, and cause the UE 102 to alleviate access barring in one access category without also alleviating barring in another access category.

Figure 5:
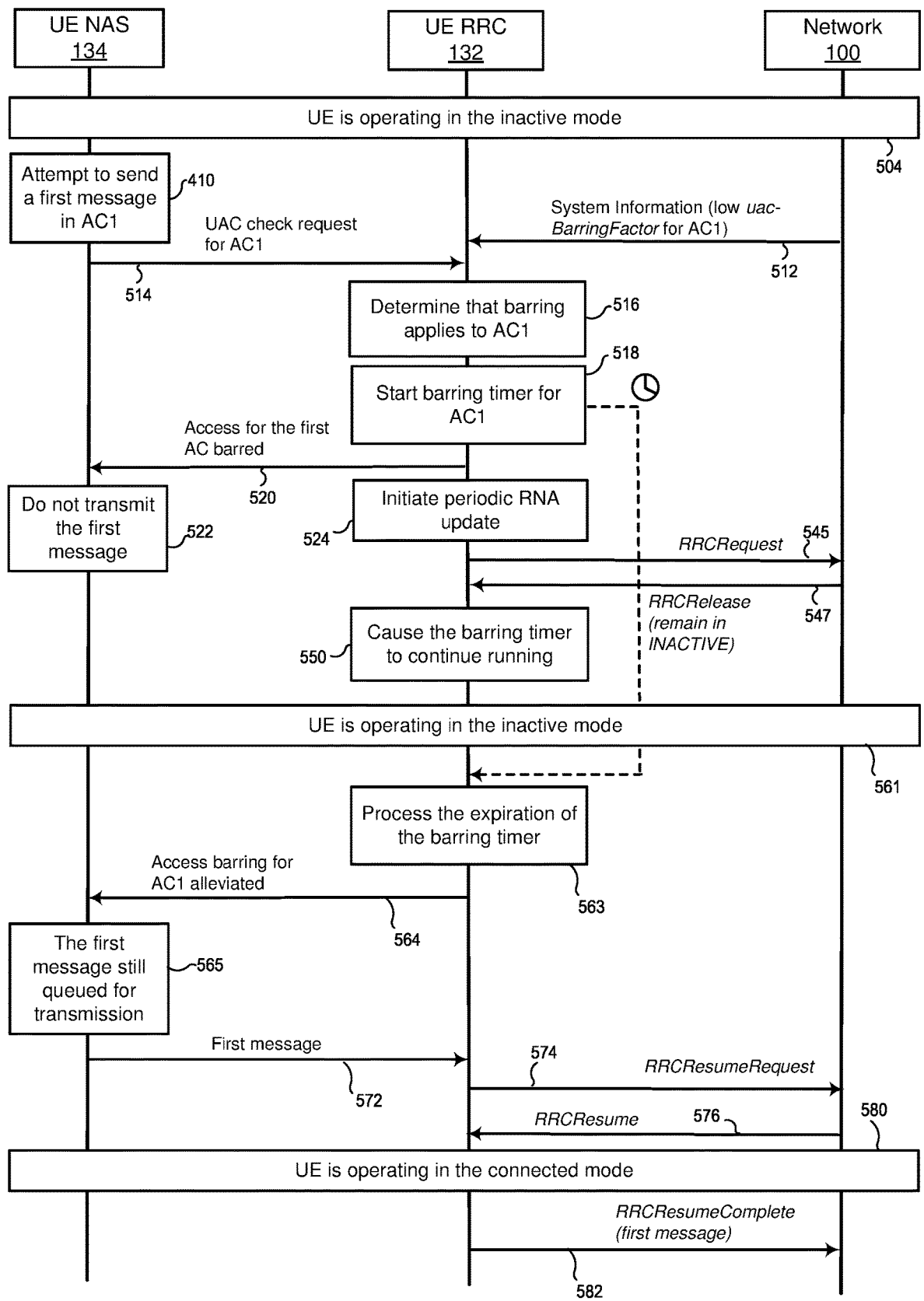
FIG. 5 illustrates a scenario in which the UE operating in RRC_INACTIVE remains in RRC_INACTIVE in response to an RRC message from the network, and causes the barring timer to continue running.

Next, FIG. 5 illustrates a scenario in which the UE 102 operating in an inactive mode remains in the inactive mode in response to an RRC message from the network, and continues running a barring timer. In particular, the UE 102 first operates 504 in the inactive mode (i.e., the UE RRC 132 is in the RRC_INACTIVE state). The scenario then includes events 510-522 that are similar to the respective ones of the events 210-222 of FIG. 2 or 310-322 of FIGS. 3A and 3B.

After starting 518 the barring timer for AC1, the UE RRC 132 initiates 524 a periodic RAN-based Notification Area (RNA) update. For example, the UE RRC 132 can initiate this procedure upon expiration of a certain periodic timer, in order to allow the network 100 to page the UE 102 more efficiently. To transmit the RNA update, the UE RRC 132 sends 545 an RRCRequest message to the network 100. Because the RRCRequest message encapsulates the necessary information, the network 100 does not need to establish a radio connection, and thus the network 100 responds 547 with an RRCRelease message that indicates that the UE 102 should remain in the active mode. To this end, the RRCRelease message can include a SuspendConfig IE.

Upon receiving the RRCRelease message, the UE RRC 132 causes 550 the barring timer to continue running for the remainder of the barring period, provided the UE RRC 132 does not detect another intervening event. The UE RRC 132 remains 561 in RRC_INACTIVE.

Subsequent events 563-582 are similar to the respective ones of the events 263-282 of FIG. 2. More specifically, these events correspond to the UE RRC 132 indicating access barring alleviation for AC1 to the UE NAS 134, the UE NAS 134 identifying and sending to the UE RRC 132 the first message queued for transmission, the UE RRC 132 performing a RRC Resume procedure to transmit the first message to the network 100, and the UE 102 transitioning to the connected mode.

In the scenario of FIG. 5, the network 100 in this scenario does not provide an explicit indication of stopping or continuing the one or more barring timers, but in general the UE 102 and the network 100 can apply any of the indication techniques discussed above. Thus, the RRCRelease message of event 547 in various implementations can include one or several flags indicating that all of the barring timers should continue, that all of the barring timers should stop, that barring timers for certain specified access categories should continue, that barring timers for certain specified access categories should stop, etc.

Figure 6:
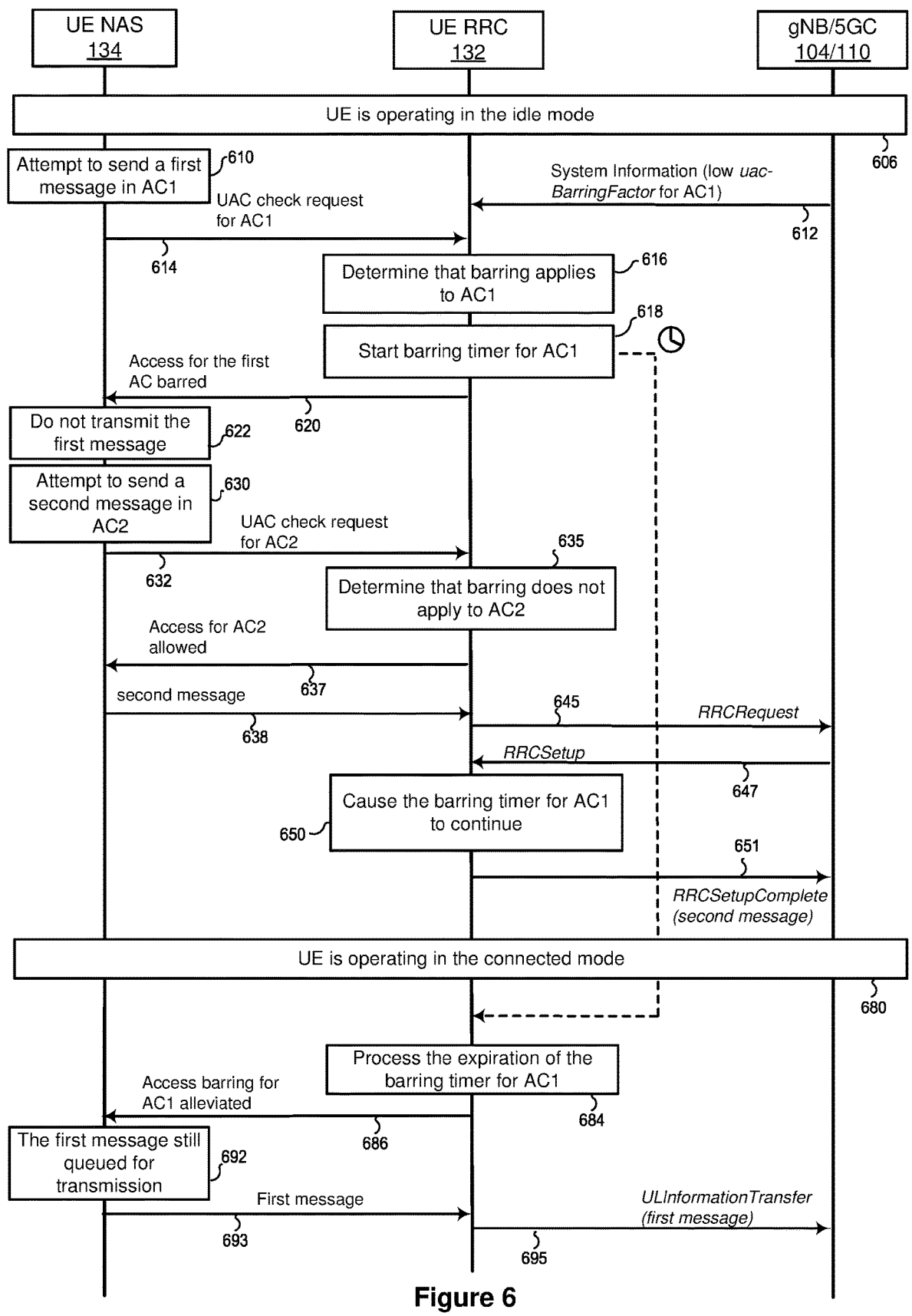
FIG. 6 illustrates a scenario in which the UE transitions from RRC_IDLE to RRC_CONNECTED in response to an RRC message from the network, and causes the barring timer to continue running.

Next, FIG. 6 illustrates a scenario in which the UE 102 transitions from the idle mode to the connected mode in response to an RRC message, without stopping a barring timer. The UE 102 initially operates 606 in an idle mode, e.g., the UE RRC 132 is in RRC_IDLE. The scenario then includes events 610-622 that are similar to the respective ones of the events 210-222 of FIG. 2 or 310-322 of FIGS. 3A and 3B.

At some point after determining to not transmit 622 the first message due to access barring of AC1, the UE NAS 134 determines 630 that the UE 102 should send, to the 5GC 110, a message that belongs to another access category, e.g., AC2. The UE NAS 134 checks 632 whether the UE NAS 132 has received barring information for AC2, and the UE RRC 132 indicates 637 to the UE NAS 134 that no barring applies to AC2 based on a determination 635. The UE NAS 134 then sends 638 the second message to the UE RRC 132. In response to receiving the second message, the UE RRC 132 establishes a radio connection by sending 645 an RRCRequest to the network 100, which responds 647 with an RRCSetup message.

Upon receiving the RRCSetup message, the UE RRC 132 causes 650 the barring timer for AC1 to continue running for the remainder of the barring period, provided the UE RRC 132 does not detect another intervening event. The UE RRC 132 then transitions to the RRC_CONNECTED state and sends 651 an RRCSetupComplete message to the network 100. The UE 102 thus begins to operate 680 in the connected mode.

The barring timer expires when the UE RRC 132 is operating in the connected mode, and the UE RRC 132 processes 684 the expiration event. The UE RRC 132 indicates 686 access barring alleviation for AC1 to the UE NAS 134. The UE NAS 134 then determines 692 that the UE 102 still queues the first message for transmission and sends 693 the first message to the UE RRC 132. In response to receiving the first message, the UE RRC 132 encapsulates the first message in a ULInformationTransfer message and sends 695 the ULInformationTransfer message to the network 100.

The UE 102 and the network 100 in general can apply any of the implicit and/or explicit indication techniques discussed above to support the scenario of FIG. 6. Thus, the RRCSetup message of event 647 in various implementations can include one or several flags indicating that all of the barring timers should continue, that all of the barring timers should stop, that barring timers for certain specified access categories should continue, that barring timers for certain specified access categories should stop, etc.

Figure 7:
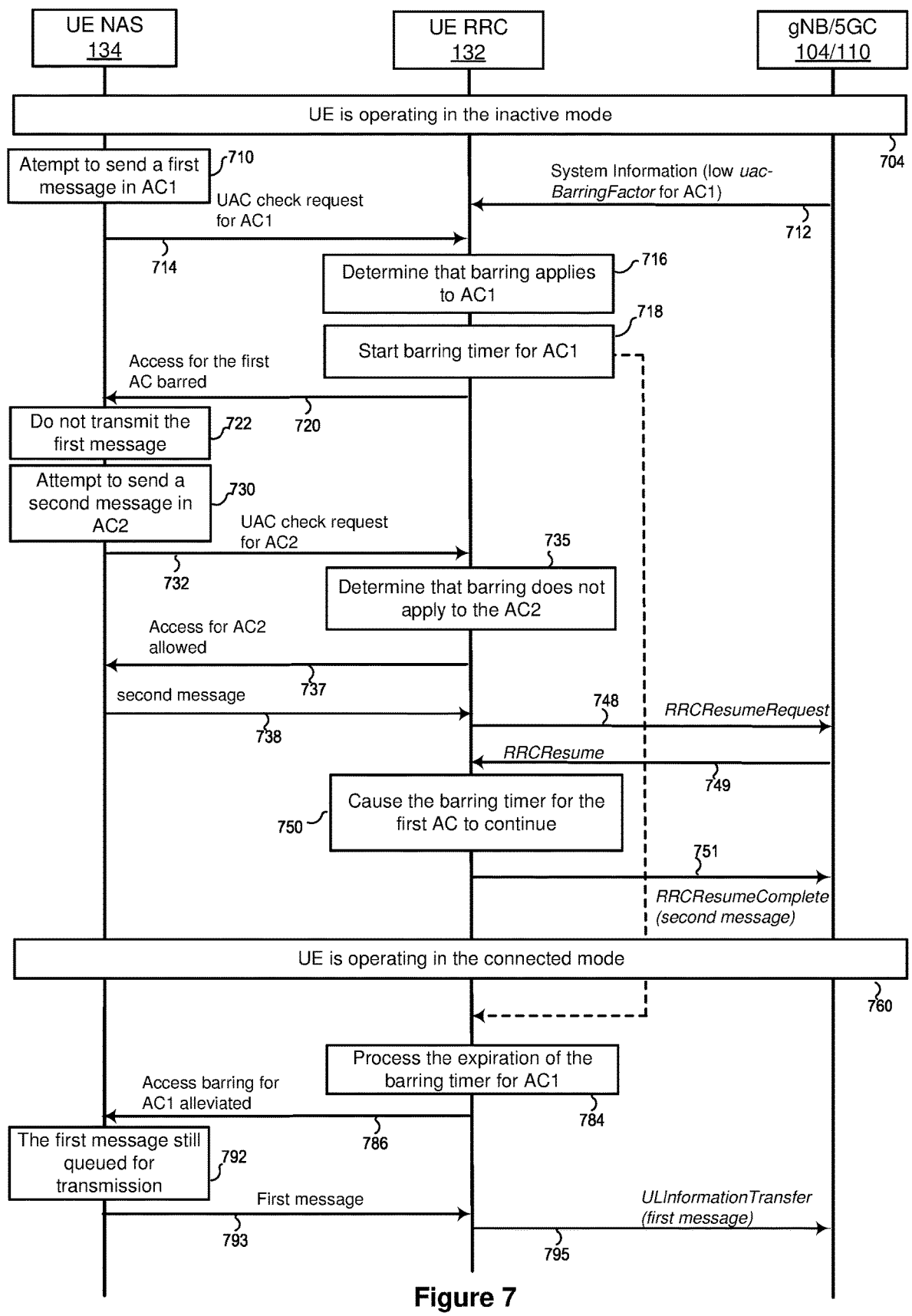
FIG. 7 illustrates a scenario in which the UE transitions from RRC_INACTIVE to RRC_CONNECTED in response to an RRC message from the network, and causes the barring timer to continue running.

The scenario of FIG. 7 is generally similar to the scenario of FIG. 6, but because the UE 102 here initially operates 704 in the inactive mode, the UE 102 resumes a radio connection instead of setting up a new radio connection. More specifically, events 710-738 are similar to the events 610-638 discussed above. The UE RRC 132 then transmits 748 an RRCResumeRequest message to the network 100 and receives 749 an RRCResume message in response. The RRCResume message in general can include one or several flags indicating that all of the barring timers should continue, that all of the barring timers should stop, that barring timers for certain specified access categories should continue, that barring timers for certain specified access categories should stop, etc. In the example implementation of FIG. 7, the RRCResume message implicitly indicates that the UE 102 should not stop the barring timer, and thus the UE RRC 132 causes 750 the barring time for AC1 to continue running. Subsequent events 751-795 are similar to the events 651-695 discussed above.

Figure 8:
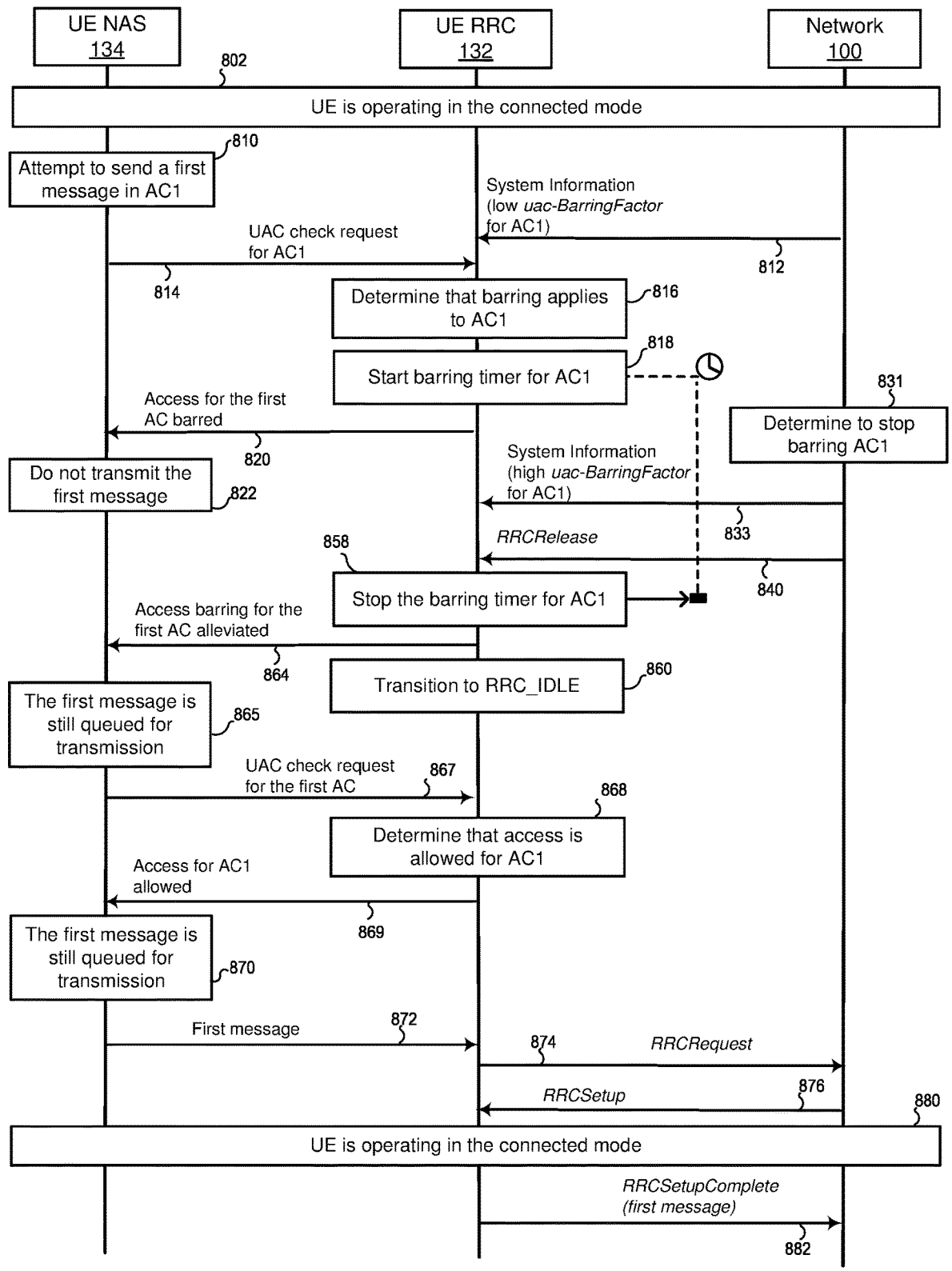
FIG. 8 illustrates a scenario in which the UE transitions from RRC_CONNECTED to RRC_IDLE in response to a message from the network, stops the barring timer, and performs a barring check prior to transmitting a message for the access category.

Now referring to FIG. 8, the UE 102 can implement another technique for determining whether the UE 102 should continue applying access control after receiving a message related to a potential transition to a new RRC state. Although the UE 102 in this scenario transitions from the connected mode to the idle mode, the UE 102 also can apply this technique for other state transitions (e.g., from the connected mode to the inactive mode, from the idle mode to the connected mode, from the inactive mode to the connected mode) or when staying in the inactive state after receiving an RRC message.

The UE 102 initially operates 802 in the connected mode, and events 810-822 are similar to the respective ones of the events 210-222 of FIG. 2, for example. While the barring timer for AC1 is running, the network 100 determines 831 to stop barring AC1 upon detecting a lower level of congestion at the 5GC 110, for example. The network 100 broadcasts 833 system information including a high barring factor (e.g., a high value of uac-BarringFactor) for AC1 or does not include the barring factor (e.g., does not include uac-BarringFactor) for AC1.

The network 100 then sends 840 an RRCRelease message to the UE 102, and the UE RRC 132 in response stops the barring timer for AC1. In the implementation consistent with FIG. 8, the UE RRC 132 stops 858 all barring timers currently running at the UE 102 in response to the RRCRelease message. The UE RRC 132 then indicates 864 access barring alleviation for AC1 to the UE NAS 134. The UE NAS 134 then determines 865 that the UE 102 still queues the first message for transmission.

However, the UE NAS 134 in this implementation does not immediately send the first message to the UE RRC 132 (unlike the scenario of FIG. 2, for example). Because the UE RRC 132 indicates 864 access bar alleviation due to an RRC message and regardless of whether the UE RRC 132 also received a high barring factor or no barring factor from the network 100 (i.e., an RRC message effectively masks a system information broadcast with new barring information), the UE NAS 134 performs an access barring check to determine whether the UE NAS 134 should transmit the first message.

The UE NAS 134 checks 867 access barring for AC1 by querying the UE RRC 132, similar to the event 814. The UE RRC 132 in this case can obtain a random value and compare the random value to the new value of uac-BarringFactor received from the network 100, similar to the check corresponding to the event 816, but in this case the UE RRC 132 determines 868 that the UE NAS 134 is allowed to access AC1, and notifies 869 the UE NAS 134 accordingly. The UE NAS 134 in response determines 870 that the UE 102 still queues the first message for transmission, and subsequent events 872-882 are similar to the events 272-282, for example.

The events 864 and 869 can correspond to the same message or different messages. More specifically, the UE RRC 132 in some implementations indicates to the UE NAS 134 whether the UE 102 can transmit messages associated with a certain access category due to access barring alleviation, absence of barring information for the access category, or barring timer expiration. In other implementations, the UE RRC 132 sends the same message to the UE NAS 134 in all of these cases.

Figure 9:
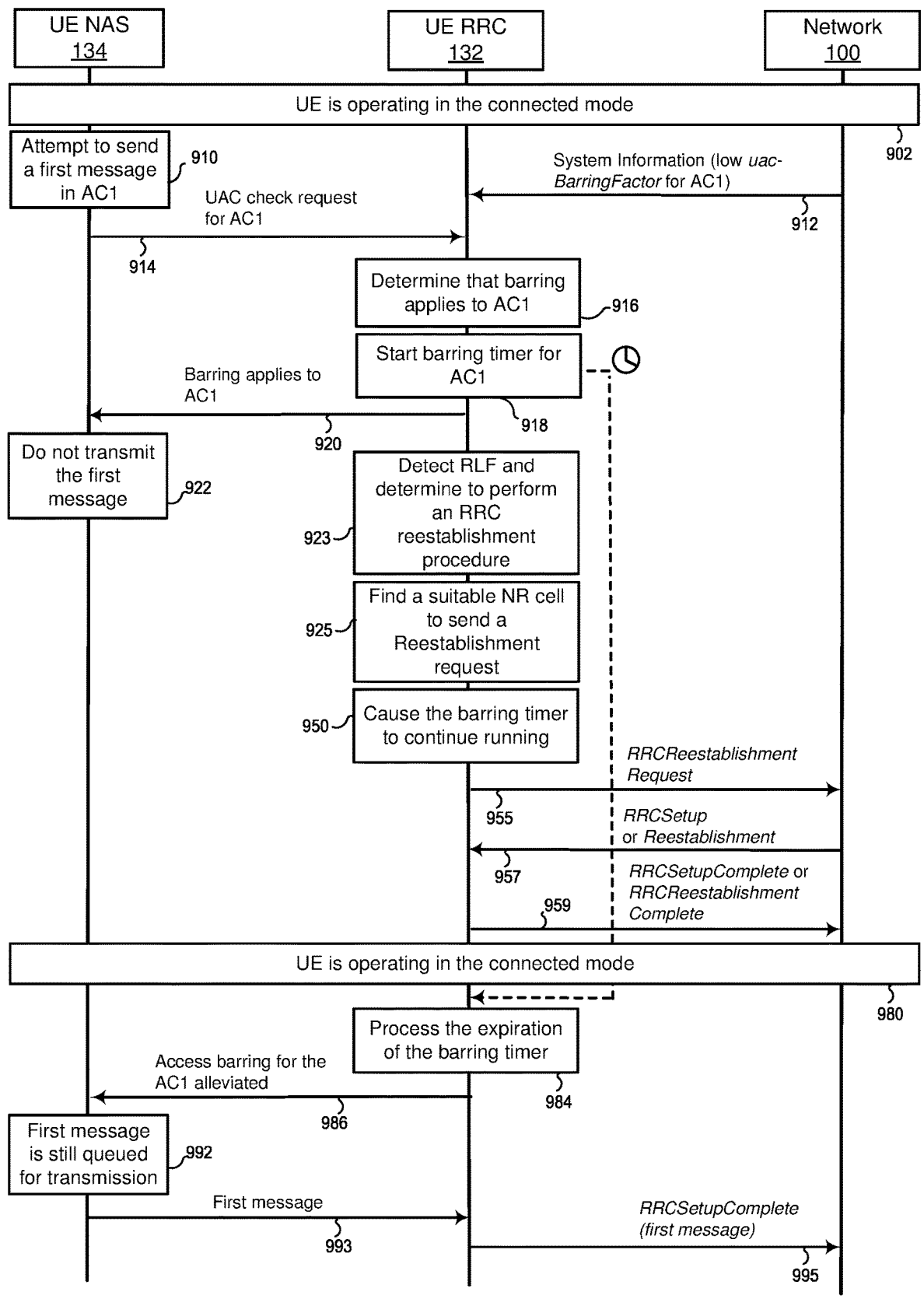
FIG. 9 illustrates a scenario in which the UE successfully performs an RRC reestablishment procedure in response to a radio link failure and causes the barring timer to continue running.
Figure 10:
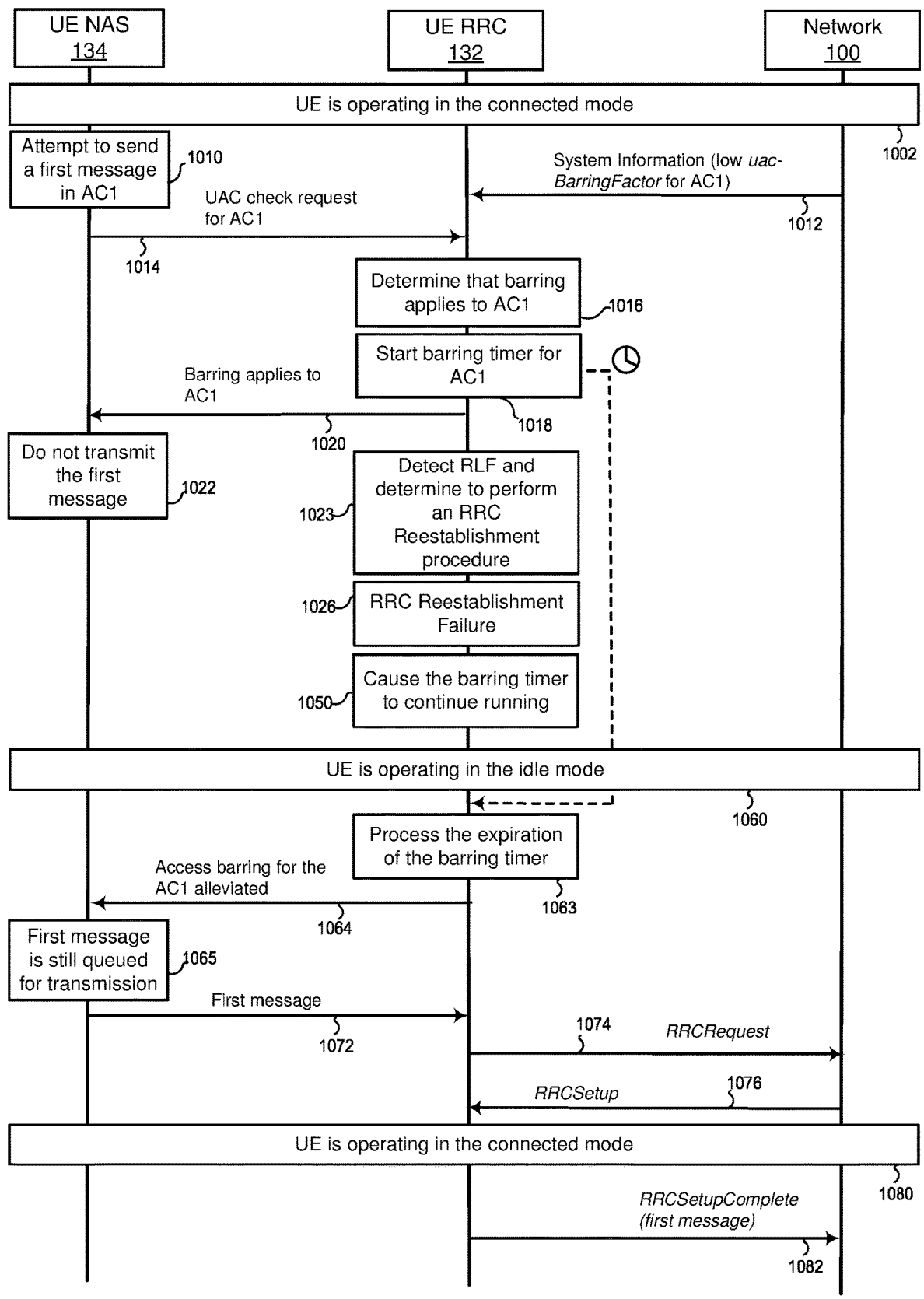
FIG. 10 illustrates a scenario in which the UE fails to perform an RRC reestablishment procedure in response to a radio link failure, transitions to the idle mode, and causes the barring timer to continue running.

An RRC reestablishment procedure is now considered with reference to FIGS. 9 and 10. Referring first to FIG. 9, the UE 102 initially operates 902 in a connected mode. Events 910-922 are similar to the respective ones of the events 210-222 of FIG. 2, for example.

The UE RRC 132 then detects 923 radio link failure (RLF) and determines to perform a cell selection procedure and an RRC connection reestablishment procedure. The UE RRC 132 finds 925 a suitable NR cell in which the UE 102 can send an RRCReestablishment message to the corresponding base station. The UE RRC 132 causes 950 the barring timer to continue running for the remainder of the barring period.

The UE RRC 132 sends 955 a RRCReestablishmentRequest message to the network 100 and receives 957 an RRCSetup or RRCReestablishment message in response. The UE 102 sends 959 a RRCSetupComplete or RRCReestablishmentComplete message to the network 100 and begins to operate 980 in the connected mode (i.e., the UE RRC 132 transitions to the RRC_CONNECTED state). Subsequent events 984-995 are similar to the respective ones of the events 684-695 of FIG. 6, for example.

FIG. 10 illustrates a scenario in which the UE 102 attempts but fails to perform an RRC connection reestablishment procedure. Events 1002-1023 are similar to the respective ones of the events 902-923 of FIG. 9. However, the UE 102 then fails 1026 to complete the RRC connection reestablishment procedure (e.g., the UE RRC 132 does not receive a response to the RRCReestablishmentRequest message within a certain amount of time). Similar to the scenario of FIG. 9, the UE RRC 132 causes 1050 the barring timer to continue running for the remainder of the barring period. Because the UE 102 could not complete the RRC connection reestablishment procedure, the UE RRC 132 transitions to RRC_IDLE, and accordingly the UE 102 begins to operate 1060 in the idle mode. Subsequent events 1063-1082 are similar to the respective ones of the events 263-282 of FIG. 2, for example.

Figure 11:
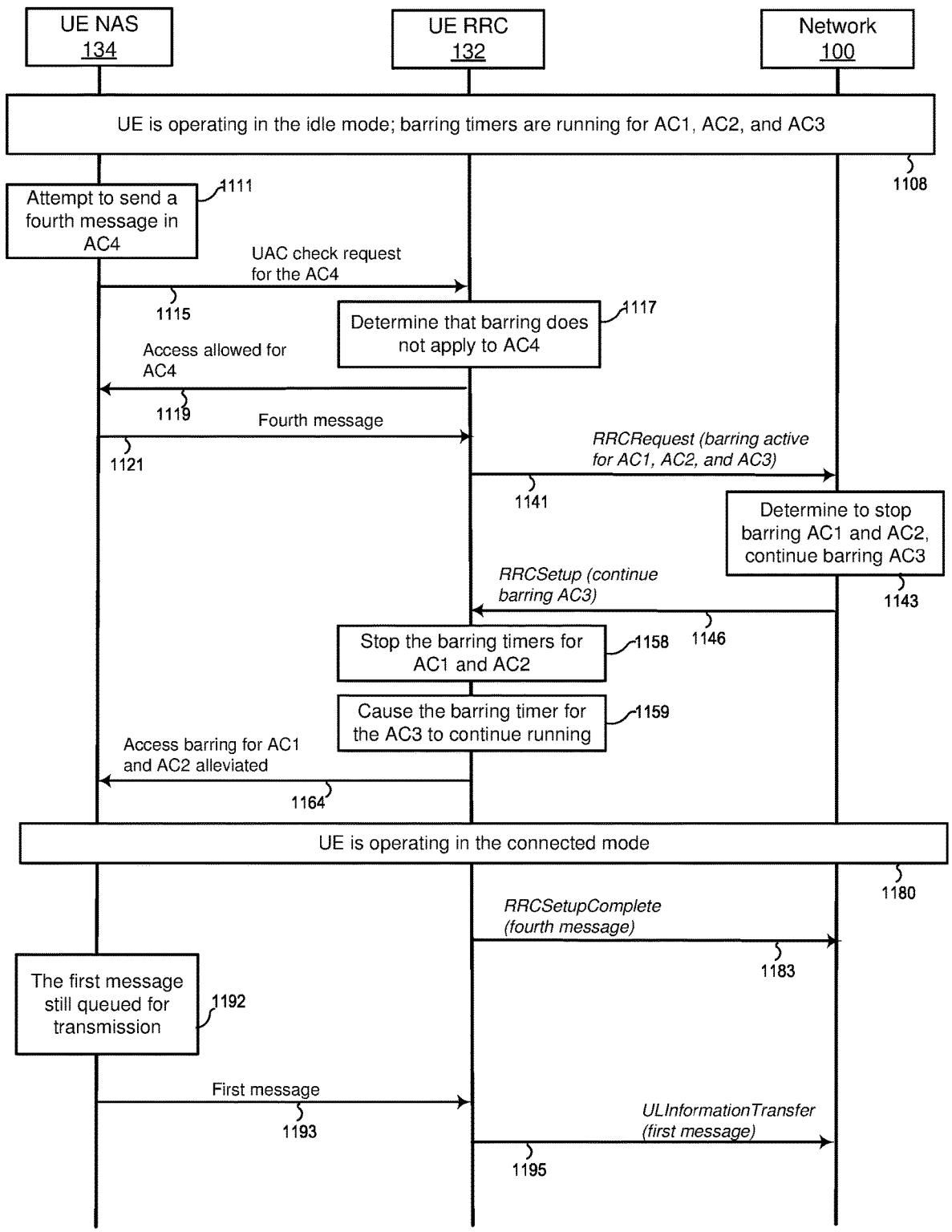
FIG. 11 illustrates a scenario in which the UE reports current access barring information to the network.

Next, FIG. 11 illustrates a scenario in which the UE 102 reports current access barring information to the network 100. The UE 102 and the network 100 in some implementations applies the technique along with a technique for providing AC-specific indications regarding barring timers to the UE RRC 132, such as the technique illustrated in FIG. 4.

The UE 102 initially operates 1108 in the idle mode. Barring timers are running for AC1, AC2, and AC3 in this example. Because the UE 102 has attempted to send at least a first message for AC1, a second message for AC2, and a third message for AC3, the disclosure refers to the message the UE NAS 134 attempts 1111 to send next as "the fourth message." The fourth message belongs to AC4. The UE NAS 134 checks 1115 access barring for AC4 by querying the UE RRC 132, which determines 1117 that no barring applies to AC4. The UE RRC 132 indicates 1119 to the UE NAS 134 that access is allowed for AC4. In response, the UE NAS 134 sends 1121 the fourth message to the UE RRC 132, and the UE RRC 132 accordingly sets up a radio connection.

The UE RRC 132 formats an RRCRequest message and includes indications of barring timers that are currently running at the UE 102. Similar to the indications the network 100 can provide to the UE 102 to indicate which barring timers the UE 102 should stop (see FIG. 3), these indications can have any suitable format. In this scenario, the UE RRC 132 sends 1141 to the network 100 an RRCRequest message that indicates that barring timers for AC1, AC2, and AC3 currently are active (running). The network 100 in response can check the current level of network congestion and/or other network conditions and determine, for example, that the UE 102 can stop barring transmissions in AC1 and AC2 but should continue barring transmissions in AC3. Depending on the implementation, the threshold level of network congestion can be a static value or a dynamic value.

The network sends 1146 an RRCSetup message to the UE 102, and the message includes an indication that the UE 102 should continue barring transmissions in AC3 (but not continue barring for AC1 and AC2), in any suitable format. The UE RRC 132 then stops 1158 barring timers for AC1 and AC2 but causes 1159 the barring timer for AC3 to continue running. The UE RRC 132 also indicates 1164 access barring alleviation for AC1 and AC2 to the UE NAS 134. To this end, the UE RRC 132 can send to the UE NAS 134 a single indication or two respective indications.

Further, the UE RRC 132 transitions to the RRC_CONNECTED state in response to the RRCSetup message, and the UE 102 accordingly begins to operate 1180 in the connected mode. The UE RRC 132 then sends 1183, to the network 100, an RRCSetupComplete message encapsulating the fourth message. Meanwhile, the UE NAS 134 determines 1192 than the UE 102 still queues the first message (corresponding to AC1) for transmission and accordingly sends 1193 the first message to the UE RRC 132, which encapsulates the first message in a ULInformationTransfer message and sends 1195 the ULInformationTransfer message to the network 100. A similar process (not shown) to events 1192-1195 may be repeated for the second message.

Figure 12:
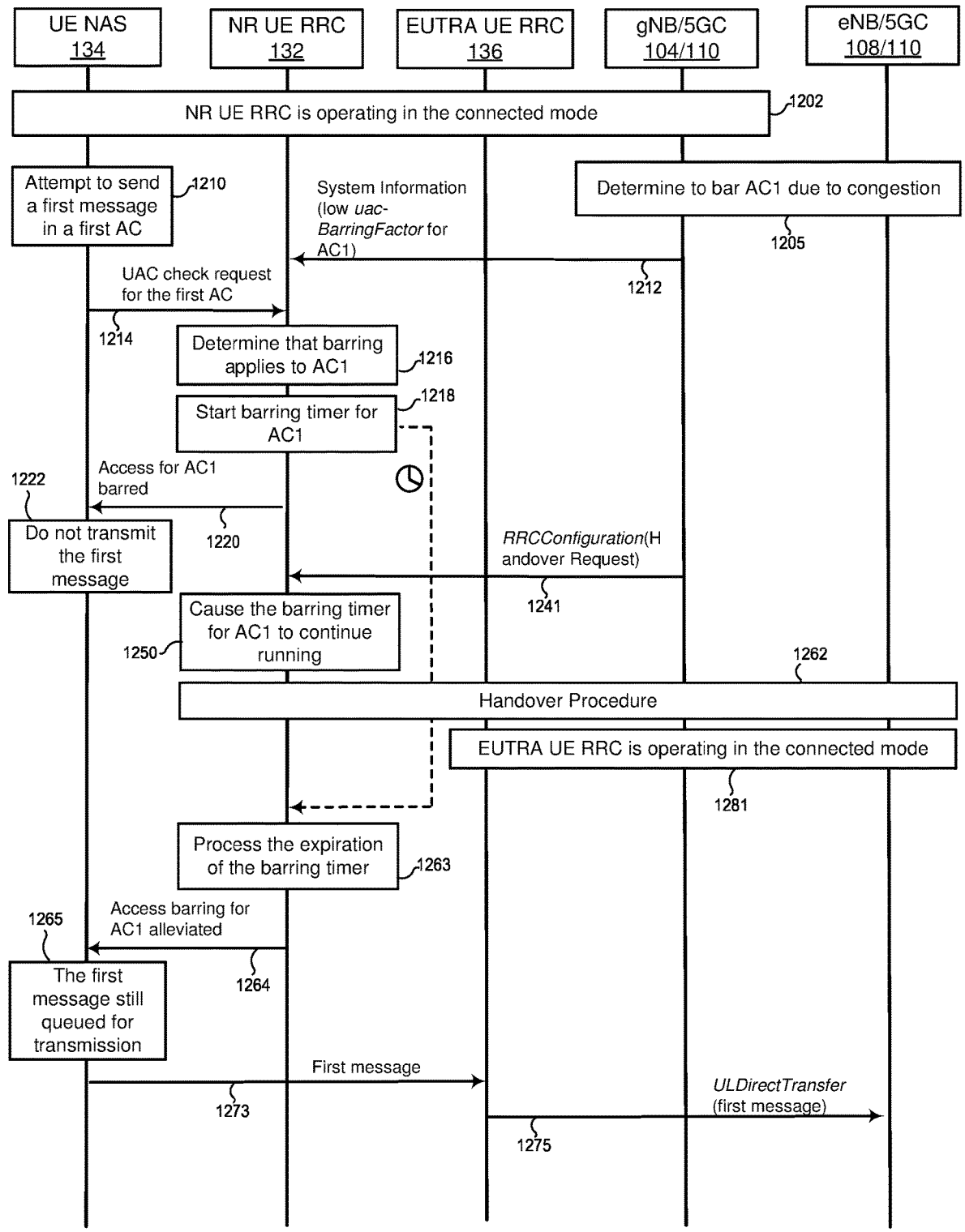
FIG. 12 illustrates a scenario in which the UE continues running the barring timer upon receiving a handover request.

In the scenario of FIG. 12, the UE 102 performs a handover procedure while a barring timer is running and continues running the barring timer upon completing the handover because the base station of the new cell connects to the same CN. FIG. 12 illustrates a transition from an NR cell to a EUTRA cell (e.g., between the cells 114 and 118 of FIG. 1B), but the UE 102 also can implement similar techniques when transitioning between NR cells, which can belong to the same base station or different base stations. However, when the UE 102 performs a handover to another CN, the UE 102 can implement a different technique and stop all the barring timers in response to the handover message because the target CN may not have network congestion in the same access categories as the source CN.

As illustrated in FIG. 12, the UE 102 initially operates in the connected mode, e.g., the UE NR RRC 132 can be in the RRC CONNECTED state. Because this scenario involves NR RRC as well as EUTRA RRC sessions, the disclosure here refers to the NR RRC controller 132 as "UE NR RRC 132" and to the EUTRA RRC controller 136 as "UE EUTRA RRC 136."

Events 1210-1222 are similar to the respective ones of the events 210-222, discussed above with reference to FIG. 2. The UE NR RRC 132 then receives 1241 a handover request from the 5GC 110, via the gNB 104. The gNB 104 can encapsulate the handover request in a MobilityFromNR-Command message, for example. In response to the handover message, the UE NR RRC 132 causes 1250 the barring timer to continue running for the remainder of the barring period. The UE NR RRC 132 then performs 1262 a handover procedure, and the UE EUTRA RRC 136 begins to operate 1281 in a connected mode, with the 5GC 110 via the eNB 108.

The UE NR RRC 132 detects that the barring timer expires while the UE EUTRA RRC 136 is in RRC_CONNECTED mode. The UE NR RRC 132 processes 1263 the expiration event and indicates 1264 access barring alleviation for AC1 to the UE NAS 134. The UE NAS 134 then determines 1265 that the UE 102 still queues the first message for transmission and sends 1273 the first message to the UE EUTRA RRC 136, which in turn encapsulates the first message in a ULInformationTransfer message and sends 1275 the ULInformationTransfer message to the 5GC 110 via the eNB 108.

The disclosure next considers several example methods which the UE 102 and/or the network 100 can implement to support the techniques of FIGS. 2-12. The corresponding devices can implement these methods using any suitable processing hardware, e.g., one or more processors executing instructions stored in a non-transitory computer-readable memory, special-purpose hardware, etc.

Figure 13:
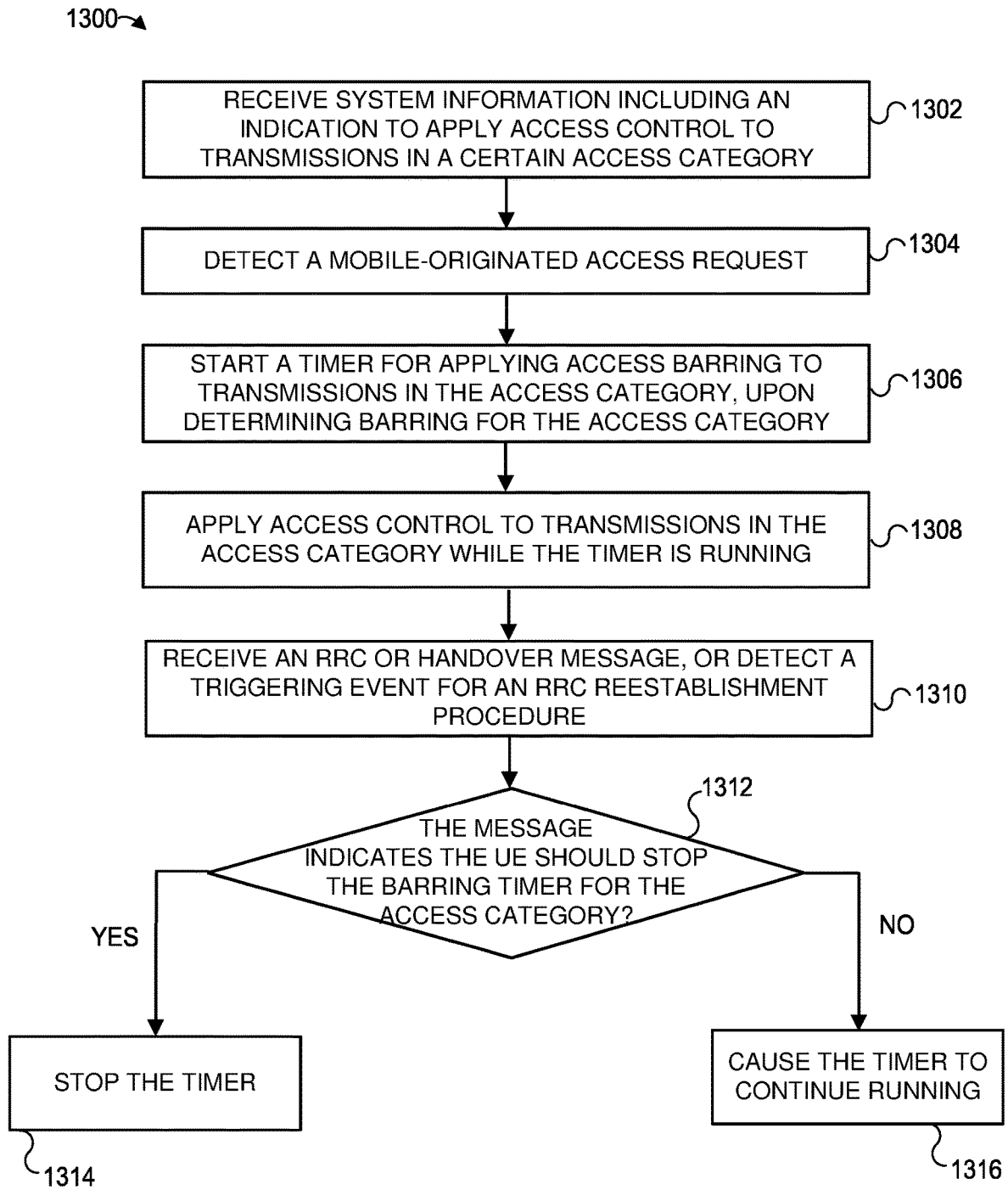
FIG. 13 is flow diagram of an example method for controlling a barring timer in accordance with an explicit indication from a network, which can be implemented in the UE of FIGS. 1A and 1B.

Referring first to FIG. 13, the UE 102 can implement a method 1300 to control a barring timer in accordance with an explicit indication from a network. The method 1300 begins at block 1302, where the UE 102 receives system information including an indication that the UE 102, as well as other UEs that receive this system information, should apply access control to a certain access category (see, e.g., events 212, 312, 412, 512, 612, 712, 812, 912, and 1012 in the examples above). The parameters in the system information can include a uac-BarringFactor for the access category with a relatively low value.

Next, at block 1304, the UE 102 detects a mobile-originated access request for this access category. More specifically, the UE 102 can attempt to send a message in the certain access category (see, e.g., events 214, 314, 414, 514, 614, 714, 814, 914, and 1014 in the examples above).

At block 1306, in response to the mobile-originated access request, the UE 102 performs a check using, for example, a random value and the received uac-BarringFactor, and determines that barring applies to the access category of the message (see, e.g., events 216, 316, 416, 516, 616, 716, 816, 916, and 1016 in the examples above). The UE 102 at block 1306 also starts a barring timer for the access category and schedules the barring timer to expire after a barring period (see, e.g., events 218, 318, 418, 518, 618, 718, 818, 918, and 1018 in the examples above). To avoid clutter, FIG. 13 does not illustrate the situation in which the UE 102 generates a low random value and proceeds to send the message despite the relatively low-valued uac-BarringFactor. As discussed above, this outcome is possible but less probable than the UE 102 determining that barring applies to the access category.

At block 1308, the UE 102 bars transmissions associated with the access category while the barring timer is running. For example, after the UE RRC 132 indicates to the UE NAS 134 that barring applies to the access category (see, e.g., events 220, 320, 420, 520, 620, 720, 820, 920, and 1020 in the examples above), the UE NAS 134 can continue queuing subsequent messages in this access category. More particularly, the UE RRC 132 need not check access barring for the access category again until the UE RRC 132 signals alleviation of access barring.

At block 1310, the UE 102 receives an RRC message related to a potential transition to a new RRC state (see, e.g., RRCRelease as in FIGS. 2-5 and 8, RRCRequest as in FIGS. 6 and 9, RRCResumeRequest as in FIG. 7), a handover message related to a potential transition to a new cell (see, e.g., event 1241 in FIG. 12), or detects a triggering event (e.g., radio link failure) for an RRC reestablishment procedure (see, e.g., event in FIG. 9 or event 1026 in FIG. 10).

The UE 102 determines at block 1312 whether the message includes an indication that the UE 102 should stop the barring timer for the access category. Depending on the implementation, the explicit indication can pertain to all barring timers that may be running at the UE 102 (see, e.g., event 342 of FIG. 3A, event 344 of FIG. 3B) or to a specific barring timer (see, e.g., event 442 of FIG. 4, event 1146 of FIG. 11). If the message includes such an indication, the flow proceeds to block 1314, where the UE 102 stops all the barring timers or the barring timers which the message specifically identifies. Otherwise, the flow proceeds to block 1316, where the UE 102 causes the one or more barring timers to continue running.

As discussed above, the indication in the RRC or handover message in some implementations can explicitly specify that one or more barring timers should continue running, and in other implementations can specify that one or more barring timers should stop.

Figure 14:
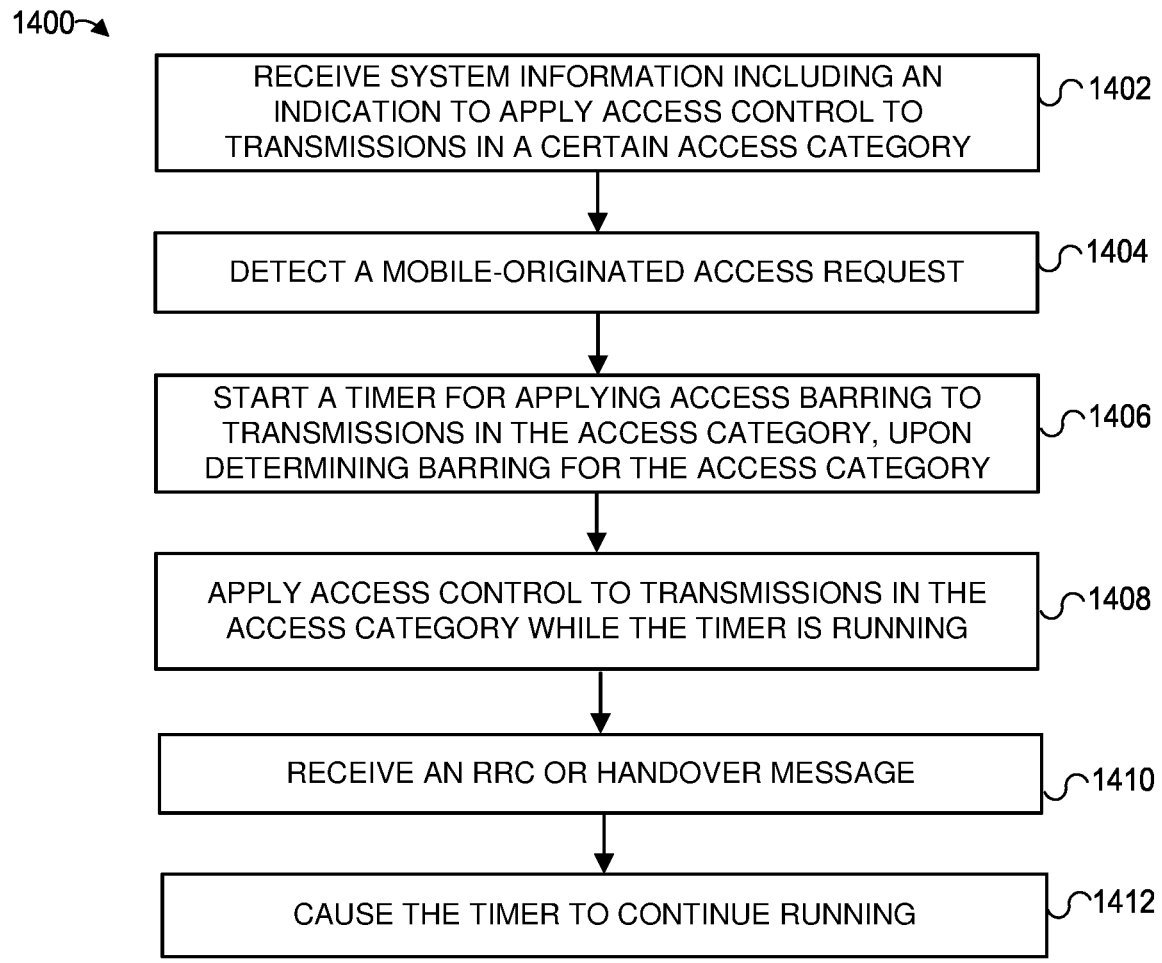
FIG. 14 is flow diagram of an example method for controlling a barring timer in response to a message related to a potential RRC state transition, which can be implemented in the UE of FIGS. 1A and 1B.

FIG. 14 next illustrates an example method 1400 that is generally similar to the method 1300. However, here the UE 102 controls a barring timer in response to a message related to a potential transition to a new RRC state or cell, and the message does not include an explicit indication related to a barring timer. Blocks 1402-1410 are similar to blocks 1302-1310 of FIG. 13. However, the UE 102 transitions from block 1410 to block 1412, where the UE causes the barring timer, or the multiple barring timers that are currently active, to continue running. The UE 102 in this implementation continues running timers without relying on an indication from the network 100 to do so (see, e.g., event 250 of FIG. 2, event 550 of FIG. 5, event 647 of FIG. 6, event 749 of FIG. 7, event 1241 of FIG. 12).

Figure 15:
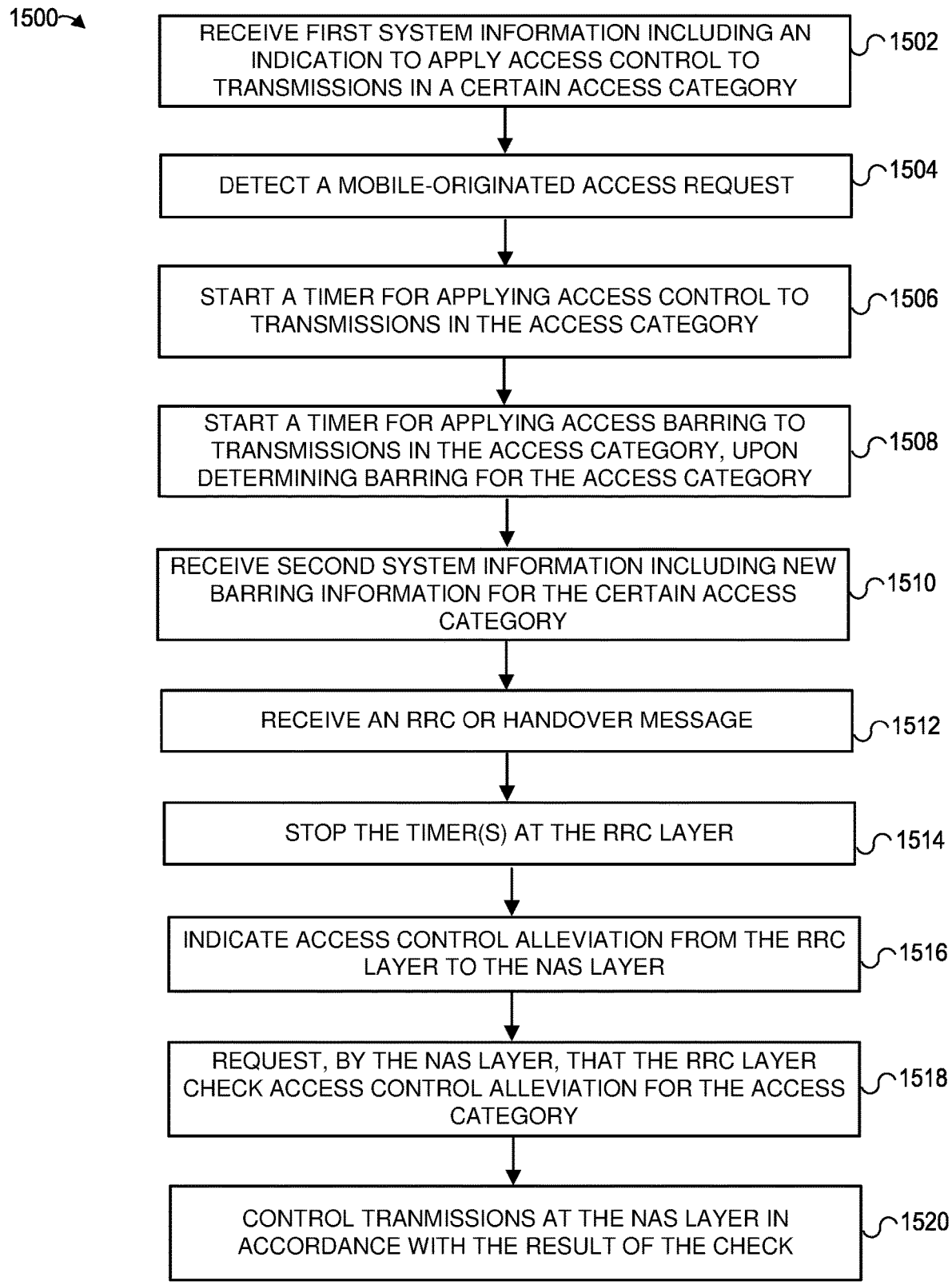
FIG. 15 is flow diagram of an example method for performing an additional barring check prior to transmitting a message for the access category, which can be implemented in the UE of FIGS. 1A and 1B.

According to the method 1500 of FIG. 15, the UE 102 performs an additional barring check prior to transmitting a message associated with the access category. Blocks 1502-1508 are similar to blocks 1302-1308 of FIG. 13. At block 1510, the UE 102 receives system information that indicates new barring information for the access category. In particular, the new barring information can include a high value of uac-BarringFactor or does not include the uac-BarringFactor (see, e.g., event 833 in FIG. 8).

At block 1512, the UE 102 receives an RRC message related to a potential transition to a new RRC state (see, e.g., event 840 in FIG. 8). In response, at block 1514, the UE 102 stops the barring timer (see, e.g., event 858 in FIG. 8). Next, at block 1516, the UE 102 indicates access control alleviation, which the UE RRC 132 provides to the UE NAS 134 (see, e.g., event 864 in FIG. 8).

At block 1518, the UE 102 performs another access barring check for the access category. More specifically, the UE NAS 134 queries the UE RRC 132 (see, e.g., event 867 in FIG. 8). At block 1520, the UE RRC 132 provides the result of the checking to the UE NAS 134 (see, e.g., event 869 in FIG. 8), and the UE NAS 134 begins to control transmissions for the access category according to this new result of checking.

Figure 16:
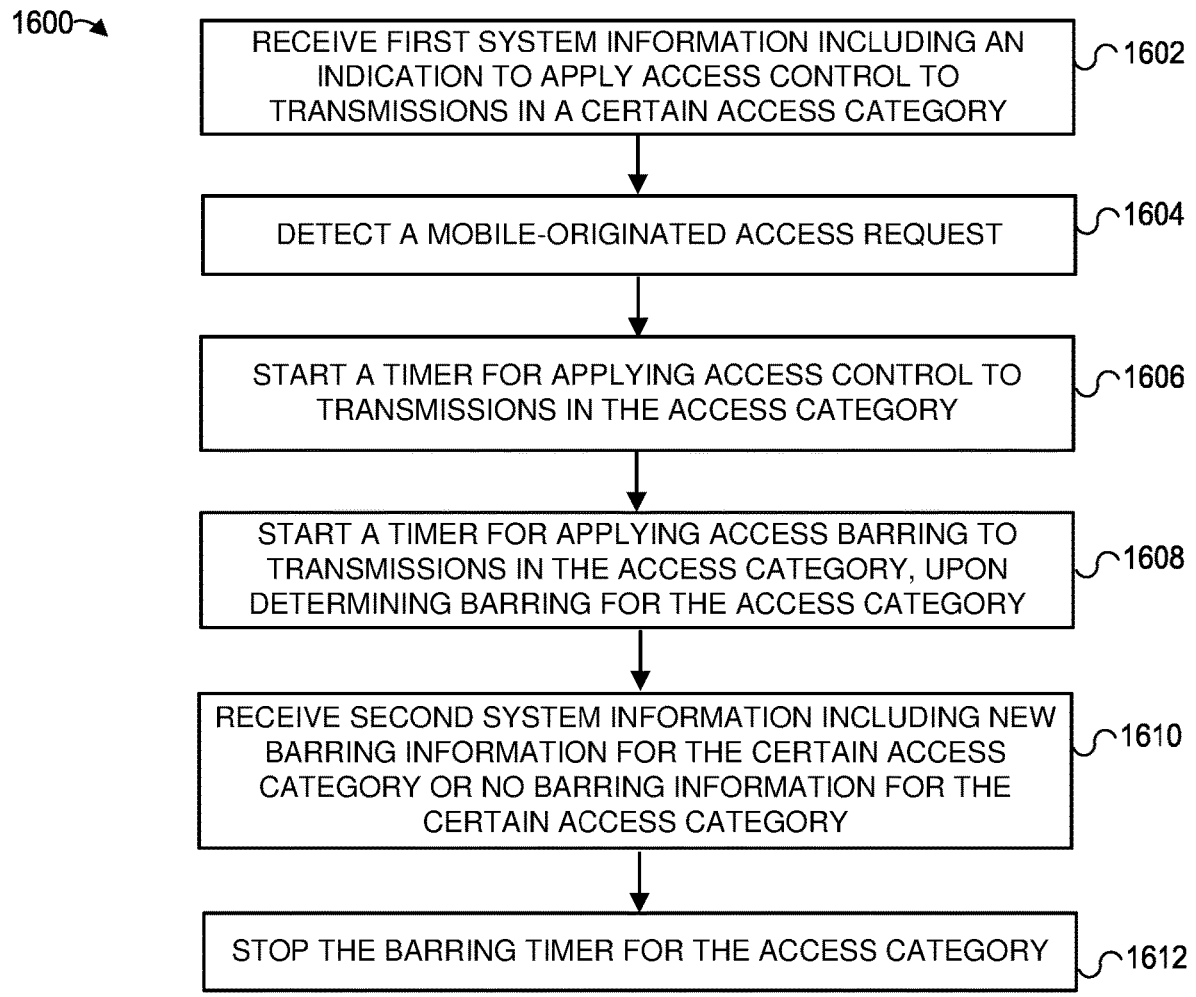
FIG. 16 is flow diagram of an example method for processing new system information that indicates no barring for an access category or access categories, which can be implemented in the UE of FIGS. 1A and 1B.

FIG. 16 is a flow diagram of an example method 1600 for processing system information that does not include barring information, which the UE 102 can implement. Blocks 1602-1608 are similar to the respective ones of the blocks 1502-1508 of FIG. 15. At block 1610, the UE 102 receives second system that includes new barring information for the access category (and, in some cases, other access categories) or, in another implementation, includes no barring information for the access category. At block 1612, the UE 102 stops the barring timer for the access category. In the latter case, when multiple barring timers for respective access categories are active at the time when the UE 102 receives new system information at block 1610, the UE 102 stops every barring timer.

Figure 17:
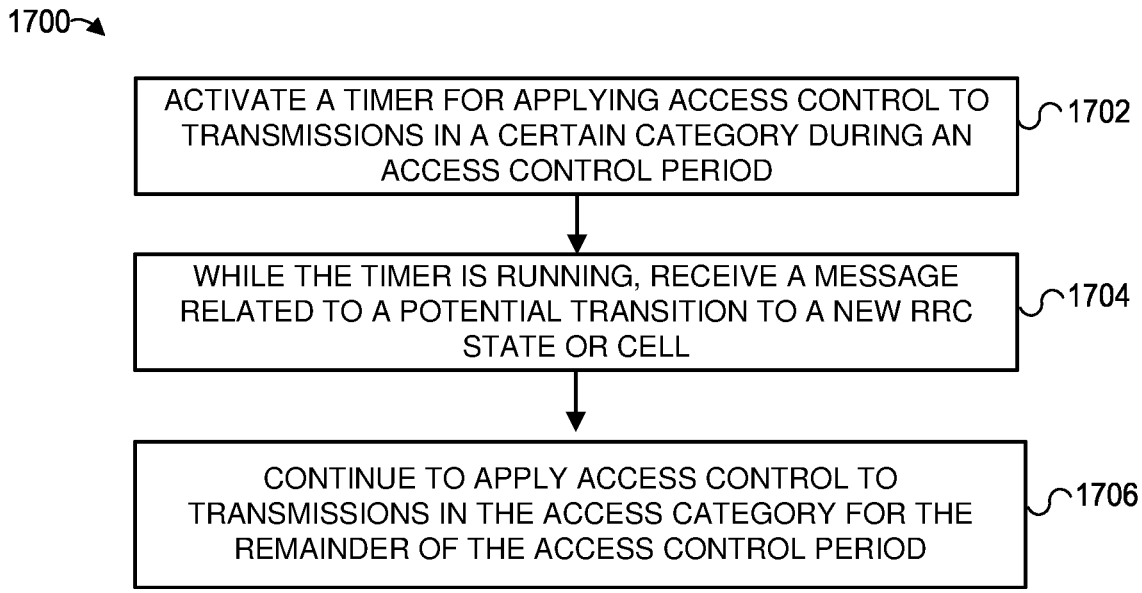
FIG. 17 is flow diagram of an example method for applying access control, which can be implemented in the UE of FIGS. 1A and 1B.

Next, FIG. 17 depicts a flow diagram of an example method 1700 for applying access control, which the UE 102 can implement.

At block 1702, the UE 102 activates an access control (or barring) timer for applying access control (e.g., access barring) to transmissions associated with a certain category during an access control (e.g., barring) period (see, e.g., events 218, 318, 418, 518, 618, 718, 818, and 1218 in the examples above; see also blocks 1306, 1406, and 1506).

At block 1704, the UE 102 receives a message related to a potential transition to a new RRC state or a new cell (see, e.g., events 240, 340, 342, 442, 545, 645, 748, 840, 1146, 1241 in the examples above; see also blocks 1310, 1410, or 1512). As discussed above, the message can be an RRC message that causes the UE 102 to transition from RRC_IDLE to RRC_CONNECTED, from RRC_CONNECTED to RRC_IDLE, from RRC_INACTIVE to RRC_CONNECTED; an RRC message that instructs the UE 102 to remain in the RRC_INACTIVE state; or a handover message (encapsulated in an RRC message, in at least some of the cases) that instructs the UE 102 to transition to another cell.

At block 1706, the UE 102 continues to apply access control to transmissions for the access category for the remainder of the access control period, unless the UE 102 receives a new indication from the network 100 or detects some other intervening event. To this end, the UE 102 can continue running the barring timer (see, e.g., events 250, 350, 459, 550, 650, 750, 1057, or 1250 in the examples above; see also blocks 1316 and 1412), or stop the barring timer but perform another access barring check for the access category (see, e.g., events 858 and 867 in FIG. 8; see also blocks 1514-1520 in FIG. 15).

Figure 18:
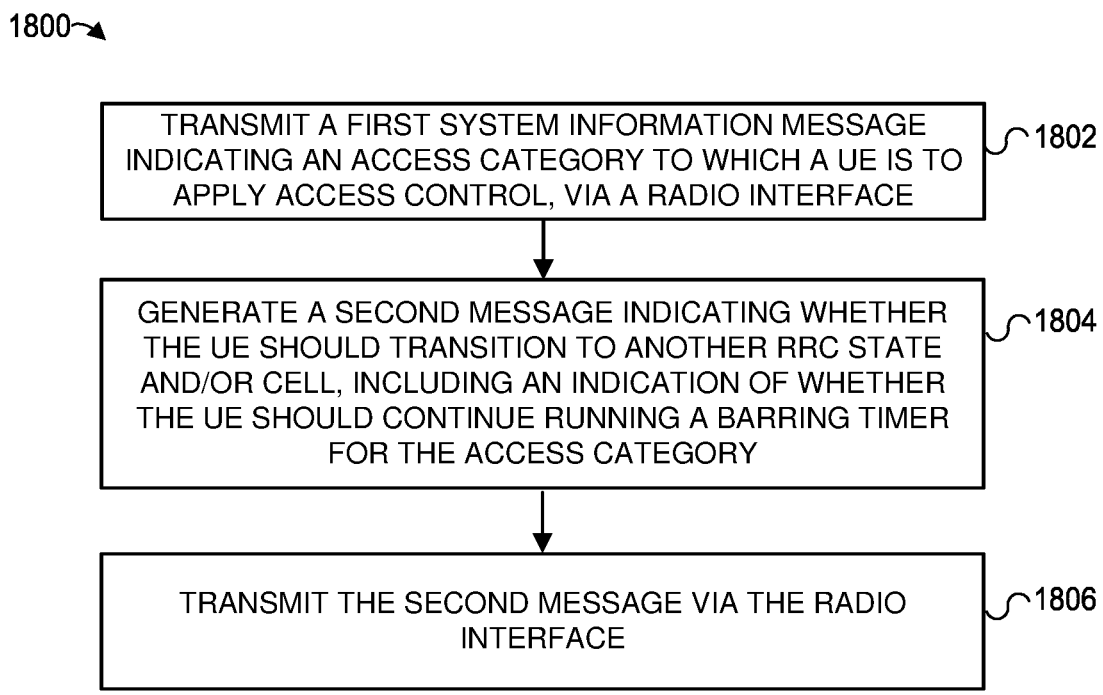
FIG. 18 is flow diagram of an example method for providing indications related to access control to a UE, which can be implemented in the network of FIGS. 1A and 1B.

FIG. 18 is flow diagram of an example method 1800 which the 5GC 110 can implement to provide indications related to access control. At block 1802, the 5GC 110 transmits a first system information message indicating an access category, or a set of access categories, to which the UE 102 should apply access control (see, e.g., events 212, 312, 412, 512, 612, 712, and 812 in the examples above). The transmission can be for example a broadcast message that includes barring information for one or more access categories.

At block 1804, the 5GC 110 generates a second message indicating whether the UE should transition to another RRC state and/or another cell. The second message includes an indication of whether the UE 102 should continue running a barring time for the access category (see, e.g., events 342, 344, 442, 1146 in the examples above). The 5GC 110 then transmits the second message to the UE 102 via the radio interface, at block 1806.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for applying access control through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

Aspect 1. A method in a user equipment (UE) for controlling transmissions, the method comprising: activating, by one or more processors and in response to a first system information message received via a radio interface and a mobile-originated access request, a timer for applying access control to transmissions for a certain access category during an access control period; receiving, by the one or more processors via the radio interface and while the timer is running, a second message that indicates a potential transition of the UE (i) from a current state associated with a protocol for controlling radio resources to another state associated with the protocol, or (ii) from a current cell to a new cell; and in response to receiving the second message, continuing to apply the access control to the transmissions for the access category, for a remainder of the access control period.

Aspect 2. The method of aspect 1, wherein continuing to apply the access control includes causing the timer to continue running for the remainder of the access control period.

Aspect 3. The method of aspect 2, wherein the second message includes an indication of whether the UE should alleviate the access control for the access category.

Aspect 4. The method of aspect 3, further comprising: prior to receiving the second message, transmitting, by the one or more processors via the radio interface, an access control report indicating one or more of a plurality of access categories to which the UE currently is applying access control.

Aspect 5. The method of aspect 2, wherein the second message includes a plurality of indications, each indicating whether the UE should alleviate access control for a respective one of a plurality of access categories.

Aspect 6. The method of aspect 2, wherein the continuing to apply the access control occurs in a first instance, the method further comprising: in a second instance, stopping the timer prior to expiration of the access control period to allow the transmissions for the access category, in accordance with the indication in the second message.

Aspect 7. The method of aspect 2, further comprising, in response to receiving the second message: transitioning to or remaining in an idle state associated with the protocol, in which the UE does not have an active radio connection with a base station; and causing the timer to continue running for the remainder of the access control period while the UE is in the idle state.

Aspect 8. The method of aspect 2, further comprising, in response to receiving the second message: transitioning to remaining in an inactive state associated with the protocol, in which the UE maintains but does not utilize a radio connection with a base station; and causing the timer to continue running for the remainder of the access control period while the UE is in the inactive state.

Aspect 9. The method of aspect 2, further comprising, in response to receiving the second message: transitioning to a connected state associated with the protocol, in which the UE has an active radio connection with a base station; and causing the timer to continue running for the remainder of the access control period while the UE is in the connected state.

Aspect 10. The method of aspect 1, further comprising, in response to receiving the second message: determining, by the one or more processors, that the second message includes an indication of alleviation of the access control for the access category; stopping the timer prior to expiration of the access control period using a radio resource control (RRC) entity of the UE; sending, from the RRC entity to a non-access stratum (NAS) entity of the UE, a notification of alleviation of the access control for the access category; sending, from the NAS entity to the RRC entity, in response to the notification, a request to check whether the second message includes the indication of alleviation of the access control for the access category.

Aspect 11. The method of any of the preceding aspects, wherein receiving the second message includes receiving an RRC command to release a radio connection between the UE and a base station.

Aspect 12. The method of any of aspects 1-10, wherein receiving the second message includes receiving an RRC command to setup a new radio connection between the UE and a base station.

Aspect 13. The method of any of aspect 1-10, wherein receiving the second message includes receiving a request to hand over the UE to another cell.

Aspect 14. A user equipment (UE) comprising: one or more processors; and a computer-readable medium storing instructions that, when executed by the one or more processors, cause the UE to perform a method according to any of aspect 1-13.

Aspect 15. A method in a network for controlling congestion, the method comprising: transmitting, by one or more processors via a radio interface, a first message indicating an access category for which a UE is to apply access control; generating, by the one or more processors, a second message indicating whether the UE should transition from its current state associated with a protocol for controlling radio resources to another state associated with the protocol, including: generating an indication of whether the UE should continue applying access control for the access category, and including the indication in the second message; and transmitting, by one or more processors via the radio interface, the second message to the UE.

Aspect 16. The method of aspect 15, wherein generating the second message includes: generating, for each of a plurality of access categories, respective indications of whether the UE should continue applying access control for the corresponding access category; for each of the plurality of access categories, including a respective indication in the second message.

Aspect 17. The method of aspect 15, wherein generating the indication includes: indicating that the UE should continue applying access control for the access category in response to determining that a congestion at a core network (CN) or a radio access network (RAN) for the access category exceeds a threshold level; and indicating that the UE should stop applying access control for the access category in response to determining that the congestion at the CN or RAN for the access category does not exceed the threshold level.

Aspect 18. The method of aspect 15, wherein transmitting the first message includes broadcasting system information for a core network (CN), via one or more cells or a radio access network (RAN) coupled to the CN.

Aspect 19. The method of aspect 15, wherein the second message is an RRC command to release a radio connection between the UE and a base station operating in the network.

Aspect 20. The method of any of aspects 1-15, wherein the second message is an RRC command to setup a new radio connection between the UE and a base station operating in the network.

Aspect 21. A network comprising: a radio access network (RAN) including one or more base stations; a core network (CN) communicatively coupled to the RAN and configured to execute a method of any of aspects 15-20.

Aspect 22. The network of aspect 21, wherein the RAN is a first RAN configured to operate according to a first radio access technology (RAT), the network further comprising: a second RAN configured to operate according to a second RAT.

What is claimed is:

1. A method in a user equipment (UE) for controlling transmissions, the method comprising:
    activating, in response to a first system information message received from a radio access network (RAN) via a radio interface and a mobile-originated access request, a timer for applying access control to transmissions for a certain access category during an access control period;
    receiving, via the radio interface and while the timer is running, a second message that indicates a potential transition of the UE from a current cell to a new cell; and
    in response to receiving the second message:
        stopping the timer, using a radio resource control RRC entity of the UE, prior to expiration of the access control period,
        sending, from the RRC entity to a non-access stratum NAS entity of the UE, a notification of alleviation of the access control for the access category,
        receiving, at the RRC entity from the NAS entity, after the sending of the notification of alleviation, a request to check alleviation of the access control for the access category, and
        determining whether to apply the access control to the transmissions for the access category, for a remainder of the access control period, in accordance with a result of the checking.

2. The method of claim 1, wherein the request to check alleviation includes
    receiving a request to check whether the second message includes the indication of alleviation of the access control for the access category.

3. The method of claim 1, wherein receiving the second message includes receiving (i) an RRC command to release a radio connection between the UE and a base station, (ii) an RRC command to setup a new radio connection between the UE and the base station, or (iii) a request to hand over the UE to another cell.

4. The method of claim 1, wherein the second message includes an indication of whether the UE should alleviate the access control for the access category.

5. The method of claim 4, further comprising:
    prior to receiving the second message, transmitting, via the radio interface, an access control report indicating one or more of a plurality of access categories to which the UE currently is applying access control.

6. The method of claim 1, wherein the second message includes a plurality of indications, each indicating whether the UE should alleviate access control for a respective one of a plurality of access categories.

7. A user equipment (UE) comprising:
    one or more processors; and
    a computer-readable medium storing instructions that, when executed by the one or more processors, cause the UE to:
    activate, in response to a first system information message received via a radio interface and a mobile-originated access request, a timer for applying access control to transmissions for a certain access category during an access control period;

receive via the radio interface and while the timer is running, a second message that indicates a potential transition of the UE from a current cell to a new cell; and in response to receiving the second message:
stop the timer, using a radio resource control RRC entity of the UE, prior to expiration of the access control period,
send, from the RRC entity to a non-access stratum NAS entity of the UE, a notification of alleviation of the access control for the access category,
receive, at the RRC entity from the NAS entity, after sending of the notification of alleviation, a request to check alleviation of the access control for the access category, and
determine whether to apply the access control to the transmissions for the access category, for a remainder of the access control period, in accordance with a result of the checking.

8. The UE of claim 7, wherein the second message includes an indication of whether the UE should alleviate the access control for the access category.

9. The UE of claim 8, further configured to:
prior to receiving the second message, transmit via the radio interface, an access control report indicating one or more of a plurality of access categories to which the UE currently is applying access control.

10. The UE of claim 7, wherein the second message includes a plurality of indications, each indicating whether the UE should alleviate access control for a respective one of a plurality of access categories.

11. The UE of claim 7, wherein the request to check alleviation includes receiving a request to check whether the second message includes the indication of alleviation of the access control for the access category.

12. The UE of claim 7, wherein the receiving of the second message includes receiving (i) an RRC command to release a radio connection between the UE and a base station, (ii) an RRC command to setup a new radio connection between the UE and the base station, or (iii) a request to hand over the UE to another cell.

13. A method in a network for controlling congestion, the method comprising:
transmitting, via a radio interface, a first message indicating an access category for which a UE is to apply access control;
generating a second message indicating whether the UE should transition from its current state associated with a protocol for controlling radio resources to another state associated with the protocol, including:
generating an indication of whether the UE should continue applying access control for the access category, and
including the indication in the second message; and
transmitting, via the radio interface, the second message to the UE.

14. The method of claim 13, wherein generating the second message includes:
generating, for each of a plurality of access categories, respective indications of whether the UE should continue applying access control for the corresponding access category;
for each of the plurality of access categories, including a respective indication in the second message.

* * * * *